United States Patent
Ishii et al.

(10) Patent No.: US 7,808,961 B2
(45) Date of Patent: Oct. 5, 2010

(54) RADIO COMMUNICATION SYSTEM AND RADIO COMMUNICATION METHOD

(75) Inventors: Hidenori Ishii, Tokyo (JP); Satoshi Senga, Saitama (JP); Hiroshi Ishida, Kanagawa (JP); Takeshi Kanazawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 603 days.

(21) Appl. No.: 11/887,833

(22) PCT Filed: Mar. 22, 2006

(86) PCT No.: PCT/JP2006/305669

§ 371 (c)(1),
(2), (4) Date: Oct. 4, 2007

(87) PCT Pub. No.: WO2006/109462

PCT Pub. Date: Oct. 19, 2006

(65) Prior Publication Data

US 2009/0052415 A1 Feb. 26, 2009

(30) Foreign Application Priority Data

Apr. 5, 2005 (JP) ............................. 2005-108845

(51) Int. Cl.
- H04L 12/26 (2006.01)
- H04J 1/16 (2006.01)
- G08C 15/00 (2006.01)
- G06F 11/00 (2006.01)
- G01R 31/08 (2006.01)

(52) U.S. Cl. .................. 370/338; 370/218; 370/329; 455/411

(58) Field of Classification Search ......... 370/218–329, 370/338–395; 455/411–417, 436–450
See application file for complete search history.

(56) References Cited

U.S. PATENT DOCUMENTS 5,539,923 A * 7/1996 Matsumoto ................. 455/443

(Continued)

FOREIGN PATENT DOCUMENTS

JP 2003-319461 11/2003

(Continued)

OTHER PUBLICATIONS

International Search Report of Jul. 11, 2006 issued in the International Application No. PCT/JP2006/305669.

(Continued)

*Primary Examiner*—Man Phan
(74) *Attorney, Agent, or Firm*—Wenderoth, Lind & Ponack, L.L.P.

(57) ABSTRACT

A terminal (101) includes interfaces for communication with a mobile network (102) and a wireless LAN (103). A first IMS server (107) performs IMS call control processing relating to terminals located in the mobile network (102) and a second IMS server (111) relays a signal relating to IMS call control processing concerning terminals located in the wireless LAN (103). These IMS servers search for a mobile network packet gateway (106), a packet data gateway (110), and a gateway to be controlled by a route change request for requesting change of a packet transmission path and relay the route change request. The route change request provided from the terminal (101) is relayed by the IMS servers to provide the change request to all networks specified. The packet transmission path is changed by the gateway in accordance with the request. Thus, the terminal having the interfaces for both of the mobile communication network and the wireless LAN can select a network to use for each communication port.

8 Claims, 18 Drawing Sheets

U.S. PATENT DOCUMENTS

| | | | |
|---|---|---|---|
| 5,682,601 A * | 10/1997 | Sasuta ........................ | 455/437 |
| 6,385,449 B2 * | 5/2002 | Eriksson et al. ............. | 455/436 |
| 6,542,729 B1 * | 4/2003 | Chmaytelli et al. ......... | 455/410 |
| 6,947,769 B1 * | 9/2005 | Itomitsu et al. ............. | 455/561 |
| 2002/0137518 A1 * | 9/2002 | Achour ........................ | 455/447 |
| 2002/0160777 A1 * | 10/2002 | Takao et al. ................. | 455/436 |
| 2003/0221063 A1 * | 11/2003 | Eguchi et al. ............... | 711/114 |
| 2005/0185653 A1 | 8/2005 | Ono et al. | |
| 2006/0002344 A1 | 1/2006 | Ono et al. | |

FOREIGN PATENT DOCUMENTS

| | | |
|---|---|---|
| JP | 2004-180311 | 6/2004 |
| JP | 2005-244525 | 9/2005 |
| WO | 2004/105272 | 12/2004 |

OTHER PUBLICATIONS

3GPP TS23.234, "3GPP system to Wireless Local Area Network (WLAN) interworking; System description", V6.4.0 (Mar. 2005).

C. Perkins, Ed., IETF RFC3344, "IP Mobility Support for IPv4", Nokia Research Center, Standards Track, Aug. 2002.

3GPP TS23.228, "IP Multimedia Subsystem (IMS); Stage 2", V6.9.0 (Mar. 2005).

3GPP TR22.934, "Feasibility study on 3GPP system to Wireless Local Area Network (WLAN) interworking", V6.2.0 (Sep. 2003).

3GPP TS33.234, "3G Security; Wireless Local Area Network (WLAN) interworking security", V6.4.0 (Mar. 2005).

J. Rosenberg et al., RFC3261, "SIP: Session Initiation Protocol", Standards Track, Jun. 2002.

A. Vaha-Sipila, "URLs for Telephone Calls", Standard Track, Apr. 2000.

English translation of the International Preliminary Report on Patentability issued Oct. 9, 2007 in PCT/JP2006/305669.

* cited by examiner

| | (a) | (b) | (c) | (d) |
|---|---|---|---|---|
| 601 TERMINAL ID | ID1 | ID1 | ID1 | ID1 |
| 602 TERMINAL STATUS | IN COMMUNICATION | IN COMMUNICATION | IN COMMUNICATION | IN COMMUNICATION |
| 603 GPRS CONNECTION INFORMATION | PDP1 | PDP1 | PDP1 | PDP1 |
| 604 WLAN CONNECTION INFORMATION | NOT SET | IPl | IPl | IPl |
| 605 ACCESS IP ADDRESS (MOBILE NETWORK) | IPa | IPa | IPa | IPa |
| 606 ACCESS IP ADDRESS (WIRELESS LAN) | NOT SET | IPb | IPb | IPb |
| 607 HOME IP ADDRESS | IPc | IPc | IPc | IPc |
| 608 IMS SERVER ADDRESS | IPs | IPt | IPt | IPt |
| 609 USING PORT NUMBER | Pa / Pv | Pa / Pv | Pa / Pv | Pa / Pv |
| 610 IP ADDRESS OF GATEWAY OF NETWORK TO USE | IPg / IPg | IPg / IPg | IPg / IPp | IPg / IPp |

FIG. 6

| | (a) | (b) | (c) | (d) |
|---|---|---|---|---|
| TERMINAL ID — 701 | ID1 | ID1 | ID1 | ID1 |
| ACCESS IP ADDRESS — 702 | IPa | IPa | IPa | IPa |
| HOME IP ADDRESS — 703 | IPc | IPc | IPc | IPc |
| USING PORT NUMBER — 704 | Pa / Pv | Pa / Pv | Pa / Pv | Pa / Pv |
| TRANSFER-DESTINATION GATEWAY IP ADDRESS — 705 | IPg / IPg | IPg / IPg | IPg / IPp | IPg / IPp |
| MAIN GATEWAY IP ADDRESS — 706 | IPg | IPg | IPg | IPp |
| GPRS CONNECTION INFORMATION — 707 | PDP1 | PDP1 | PDP1 | PDP1 |

FIG. 7

RADIO COMMUNICATION SYSTEM AND RADIO COMMUNICATION METHOD

BACKGROUND OF THE INVENTION

1. Technical Field

The present invention relates to a radio communication system technology in an interworking system between a mobile communication network and a wireless LAN that enables communications over a mobile communication network and a wireless LAN performed by a terminal having interfaces to both of the communication networks to be optimally allocated between the networks.

2. Background Art

Engineers are working to build a communication system that allows mobile phones capable of communicating in a wide area to interwork with a public wireless LAN service which enables fast data communication in a relatively small area to complement each other. In such a communication system, the following service, for example, can be provided by using a terminal capable of accessing both mobile phone network and wireless local area network (WLAN). A terminal uses a mobile communication network in which an area covered by each base station is wide to maintain connection while the mobile phone is moving fast whereas the terminal uses a wireless LAN to make fast access while the terminal is moving slowly or is stationary.

The interworking system is standardized by the 3GPP (3rd Generation Partnership Project). The 3GPP has standardized an architecture in which a scenario for accessing a packet service provided by a mobile network through a Wireless Local Area Network (WLAN), for example. 3GPP specifications are a new worldwide standard for creation, delivery and playback of multimedia over third-generation fast wireless networks. In 3GPP specifications, TR (Technical Report) 22.934 describes requirements of interworking systems, TS (Technical Specification) 23.234 (see 3GPP TS23.234 "3GPP system to Wireless Local Area Network (WLAN) interworking; System description") describes an architecture, and TS33.234 describes an authentication method.

In these interworking system specifications, six scenarios, Scenarios 1 to 6, are defined for different interworking forms. For example, in Scenario 3, a service is defined that enables a terminal in an area covered by a wireless LAN to access a mobile communication network. In Scenario 4, a service is defined that enables a terminal to maintain an ongoing communication session when the terminal moves between a wireless LAN coverage area and a mobile communication network coverage area during communication.

One method for implementing Scenario 4 by using an existing technique is to combine Mobile IPv6 with a 3GPP interworking system. Mobile IPv6 is specified by RFC 3344 of the IETF (Internet Engineering Task Force) (see IETF RFC 3344, "IP Mobility Support for IPv4"). The aim of this technology is to hide movement of a terminal from the other party's terminal by using Mobile IPv6. This enables the terminal to maintain an ongoing communication session when the terminal moves between a wireless LAN and a mobile communication network.

FIG. 19 is a diagram for outlining a configuration of a system which is a combination of a Mobile IPv6 and a 3GPP interworking system. In FIG. 19, reference numeral 1901 denotes a terminal, which corresponds to UE (User Equipment) in 3GPP. The terminal 1901 includes interfaces for a wireless LAN and a mobile phone network and is connected to a mobile (communication) network 1902 and a wireless LAN 1903. The mobile network 1902 includes a mobile access network 1904, a packet controller 1905, and a mobile network packet gateway 1906. The wireless LAN 1903 includes a WLAN access network 1908, a WLAN gateway 1909, and a packet data gateway 1910.

The mobile access network 1904 provided in the mobile network 1902 is capable of communicating with the mobile phone of the terminal 1901. The mobile access network 1904 corresponds to UTRAN (Universal Terrestrial Radio Access Network) of 3GPP. The packet controller performs GPRS (General Packet Radio Service) connection setup for the terminal 1901. The packet controller 1905 corresponds to SGSN (Serving GPRS Support Node) of 3GPP. The mobile network packet gateway 1906 corresponds to GGSN (Gateway GPRS Support Node) of 3GPP. The mobile network packet gateway 1906 relays packets between the mobile network 1902 and a public packet-switched network 1911.

The WLAN access network 1908 provides a wireless LAN connection to the terminal 1901. The WLAN access network corresponds to WLAN AN (Access Network) of 3GPP. The WLAN gateway 1909 is connected to the WLAN access network 1908 and relays packets that have access to the mobile network 1902. The packet data gateway 1910 relays WLAN packets to the public packet-switched network 1911. The public packet-switched network 1911 is connected to the mobile network 1902 and the wireless LAN 1903 and performs packet switching in the public packet-switched network 1911. The public packet-switched network 1911 corresponds to PDN of 3GPP.

An IMS server 1907 controls an IMS (IP Multimedia Core Network Subsystem) which connects the mobile network packet gateway 1906 to the packet data gateway 1910 and supports realtime communications on a packet-switched network. The IMS server 1907 corresponds to P-CSCF (Proxy-Call Session Control Function) of 3GPP. A user information storing device 1912 manages the connection status of the terminal 1901. The user information storing device 1912 is connected to an authentication system 1913. The authentication system 1913 relays signals for authentication between the user information storing device 1912 and the WLAN gateway 1909 when authentication requested from a wireless LAN is performed. The user information storing device 1912 corresponds to both of AAA Proxy and AAA Server of 3GPP.

Connected to the public packet-switched network 1911 are a home agent 1914 and a correspondent node 1915. The home agent 1914 is a home agent of Mobile IP. The correspondent node 1915 communicates with the terminal 1901.

The following provides an overview of operation of the communication system shown in FIG. 19. When the terminal 1901 is powered on, the terminal 1901 first registers the position of itself and enters the standby state. At this point of time, the terminal 1901 obtains an access IP address for accessing the mobile network 1902 and registers the home IP addresses of the terminal and Mobile IP with the IMS server 1907.

The access IP address IPa is an IP address used when the terminal 1901 accesses the public packet-switched network 1911. When the terminal 1901 uses the mobile network 1902, the mobile terminal 1901 obtains an access IP address through the mobile network packet gateway 1906. When using the wireless LAN 1903, the mobile terminal 1901 obtains an access IP address through the packet data gateway 1910. Since the mobile terminal 1901 is located in an area (M1) covered by the mobile network 1902 in the example shown in FIG. 19, the mobile terminal 1901 obtains the access IP address IPa through the mobile network packet gateway 1906.

After obtaining the access IP address, the mobile terminal 1901 uses the access IP address IPa and the home IP address IPc to register its position with the home agent 1914. For the position registration, the mobile terminal 1901 may holds its unique home IP address IPc or a functional element of the network may assign the home IP address IPc. After completion of the position registration, the terminal 1901 registers an ID (IMSI: International Mobile Subscriber Identifier) of the terminal 1901 and the home IP address IPc with the IMS server 1907. The position registration processing is thus completed.

Then, the terminal 1901 waits for a call. An example will be described here in which, after the mobile terminal 1901 enters the wait (standby) state, the mobile terminal 1901 sends a signal using IMS to start a video telephone call which is a combination of audio and video. The audio and video streams are transmitted through the home agent 1914 and the mobile network packet gateway 1906.

When the terminal 1901 enters an area (L1) of the wireless LAN 1903, packets are transmitted to the mobile terminal 1901 over the wireless LAN 1903. An overview of a handover process for making this switching will be given below. When the mobile terminal 1901 enters a cell L1, the mobile terminal 1901 obtains an access IP address IPb for accessing the wireless LAN 1903. Then the terminal 1901 performs Mobile IP registration with the home agent 1914 in order to perform communication over the wireless LAN 1903. The home agent 1914 updates information concerning communication by the terminal 1901 so that packets are routed through the packet data gateway 1910.

With the process described above, the home IP address IPc used by the home agent 1914 appears to remain unchanged to the correspondent node 1915 when the terminal 1901 moves from the mobile network (M1) to the wireless LAN (L1) during communication. Because the home IP address IPc has been registered, it no longer needs to be registered with the IMS server 1907.

Japanese Patent Application Laid-Open No. 2004-180311 discloses a method for connecting a terminal device to a router in a radio communication network. In the method, the terminal device uses a first network interface to establish a link-layer connection with a first access point, then uses a second network interface to detect a second access point and establish a link-layer connection with the second access point. Then determination is made as to whether the terminal device is compatible with a connection router connecting to the second access point before the terminal device is connected to the connection router.

FIG. 20 is a conceptual diagram for illustrating the method disclosed in Japanese Patent Application Laid-Open No. 2004-180311 described above. In the system shown in FIG. 20, a mobile network 2002 interworks with a wireless LAN 2003, as with the system shown in FIG. 19. A mobile network packet gateway 2004 is provided in the mobile network 2002 and an LMA (Local Mobility Agent) 2005 is provided in the wireless LAN 2003. Functional elements relating to radio communication such as a radio network controller (RNC) are not shown. Basic operation of a terminal 2001, the mobile network 2002, and the wireless LAN 2003 shown in FIG. 20 is the same as that of the system in FIG. 19 and a public packet-switched network 2007 and a correspondent node 2008 are also the same as the public packet-switched network 1901 and the correspondent node 1915 of FIG. 19. Therefore, overlapping description of these will be omitted.

Like the mobile network packet gateway 1906 shown in FIG. 19, the mobile network packet gateway 2004 relays packets and manages connection of the terminal 2001. The LMA 2005 relays packets between the mobile network 2002 and the wireless LAN 2003 and assigns an access IP address in response to a request from the terminal 2001. An ISP (Internet Service Provider) 2006 provides connection to the public packet-switched network 2007 and assigns an IP address to the terminal 2001.

In the system shown in FIG. 20, when the terminal 2001 is powered on, connection of the terminal 2001 to the public packet-switched network 2007 is established. The terminal 2001 uses a GPRS procedure to obtain an IP address IP-mt and generates connection information called "Secondary PDP context" for a GGSN. The "Secondary PDP context" is connection information on GPRS connection such as QoS. Relay information in the connection information can be used for the wireless LAN as well.

When the terminal 2001 enters an area of the wireless LAN 2003, the terminal 2001 obtains an access IP address for accessing the wireless LAN 2003 and performs Mobile IP registration with the LMA 2005. The LMA 2005 uses GPRS to perform registration with the mobile network packet gateway 2004. As a result, the LMA 2005 of the wireless LAN 2003 is associated with the connection information on the terminal 2001 and packets of the terminal 2001 are transferred through the LMA 2005.

Packets directed to the terminal 2001 are transferred through both of the mobile network 2002 and the wireless LAN 2003 at the same time in the system shown in FIG. 20. This can distribute the load across the networks when traffic concentrates one of the networks.

DISCLOSURE OF THE INVENTION

As mentioned above, six different scenarios, Scenarios 1 to 6, designed for different forms of interworking systems are defined in specifications for interworking systems as shown in FIG. 19. Defined in these scenarios are a service that enables a terminal in an area of a wireless LAN to access a mobile network and an ongoing service that enables a service for a terminal in communication to be maintained when the terminal moves from an area of a wireless LAN to an area of a mobile network during communication.

However, a network suitable for transferring service data cannot be selected for each service used by the terminal because the terminal is associated with a communication path in one-to-one correspondence in the services described above. There is a problem that, when a load concentrates the mobile network 1902 or the wireless LAN 1903, the load cannot be distributed by transferring users connecting to the network on which the load is concentrated to the other network.

On the other hand, in the interworking system shown in FIG. 20, the relationship between the mobile network and the wireless LAN is inevitably fixed. In particular, the LMA 2005 must have an address of the mobile network packet gateway 2004 beforehand in order to transfer a request for registration from the terminal 2001 to the mobile network packet gateway 2004. The mobile network packet gateway 2004 uses GPRS connection information to manage the wireless LAN 2003. Accordingly, the LMA 2005 must implement GPRS, which is a 3GPP standard protocol having limited applications. The LMA 2005 cannot implement Mobile IP (IETF RFC 3344 "IP Mobility Support for IPv4"), which is an IETF standard. Because of these restrictions, networks to which interworking connection can be made are limited in the system shown in FIG. 20.

The present invention has been made in light of these problems and an object of the present invention is to enable a packet allocation method to be appropriately set when interworking connection is to be made to an unknown network, by performing packet allocation processing in both of a mobile network and a wireless LAN and by using IMS in connection switching due to a factor of a network and in setting of packet allocation.

A radio communication system according to the present invention includes: a public packet-switched network; multiple radio communication networks, each including a gateway; a terminal capable of establishing packet connection with the multiple radio communication networks; a correspondent node which performs packet communication with the terminal over the public packet-switched network; and a router which manages a destination address of the terminal, the destination address changing in accordance with movement of the terminal; wherein the terminal specifies, for each port number of the terminal, a gateway that relays packets sent from the correspondent node to the terminal and sets information which specifies the gateway in a main gateway selected from the multiple gateways; the router outputs packets which are input from the correspondent node and are directed to the terminal to the main gateway; the main gateway outputs packets directed to the terminal to a transfer-destination gateway associated with an IP address specified for each port number of the terminal; the gateway outputs packets which are input from the main gateway and are directed to the terminal to the terminal; and the terminal outputs packets directed to the correspondent node to the transfer-destination gateway associated with the IP address specified for each port number.

With this configuration, a network to which packet data is to be transferred can be specified for each port and, when interworking connection is to be made to an unknown network, packets can be appropriately allocated.

The radio communication system described above further includes: a main-network IMS server which belongs to a main radio communication network having the main gateway therein and controls a packet call; and a visited-network IMS server which belongs to a visited radio communication network other than the main radio communication network and controls a packet call; wherein, the visited-network IMS server performs transfer setup processing for relaying packets having a specified port number to a gateway provided in the visited radio communication network and outputs to the main-network IMS server a route change request containing a set of an identifier of the terminal, the port number, and an IP address of the transfer-destination gateway; and the main-network IMS server performs transfer setup processing for changing the transfer destination of packets having a specified port number to the transfer-destination gateway in response to the route change request, the transfer setup processing being applied to the main gateway.

This configuration has effects that a packet data transmission route can be flexibly changed by a user specifying a setting and operation of the terminal and a transmission route can be changed for each port even when gateways of the move-to and move-from networks do not hold information about each other's addresses.

In the radio communication system, the terminal is capable of outputting the route change request to the main-network IMS server or the visited-network IMS server and the visited-network IMS server performs the transfer setup processing in response to the route change request from the terminal.

This configuration enables packet transfer processing responsive to a route change request input from the terminal.

The radio communication system further includes a gateway setup section which outputs operation information concerning one gateway selected from the multiple gateways, and an operation information management section which collects operation information output from another of the multiple gateways, wherein, the selected one gateway compares operation information concerning the selected one gateway with operation information concerning the another gateway and performs main-gateway change processing for changing the main gateway on the basis of the result of the comparison, the main-gateway change processing being applied to the another gateway; the another gateway performs change processing for changing a main gateway associated with the terminal which is specified on the basis of the main-gateway change processing to the selected one gateway; and the selected one gateway outputs to the router an MIP route change request for registering an address of the selected one gateway as a care-of address when the main gateway is changed.

With this configuration, packet transfer processing responsive to a request from a radio communication network can be performed and increase in the load and congestion on the radio communication network can be avoided.

A radio communication method according to the present invention includes steps required for radio communication in the system described above.

This configuration enables a packet allocation method to be appropriately set even when interworking connection is to be made to an unknown network, because packet allocation processing is performed in both of a mobile network and a wireless LAN.

The radio communication system according to the present invention enables a packet allocation method to be appropriately set even when interworking connection is to be made to an unknown network, because packet allocation processing is performed in both of a mobile network and a wireless LAN.

The radio communication system according to the present invention has the capability of allowing a user to select a communication network to use in accordance with the type and/or features of data to be transmitted and is useful as an interworking system with multiple communication networks. In addition, the radio communication system can be used in applications such as problem prevention for a communication common carrier to avoid concentration of load or congestion on a particular network or nodes.

As will be described below, there are other modes of the present invention. Therefore, the disclosure of the present invention is intended to provide some embodiments of the present invention and is not intended to limit the scope of the present invention claimed.

BRIEF DESCRIPTION OF THE DRAWINGS

FIG. 6 is a field diagram showing data in a terminal status management section of the terminal in the first embodiment of the present invention;

FIG. 7 is a field diagram showing data in a terminal status management section of the mobile network packet gateway in the first embodiment of the present invention;

BEST MODE FOR CARRYING OUT THE INVENTION

A radio communication system according to the present invention will be described with reference to the accompanying drawings. However, the detailed description that follows and the accompanying drawings are not intended to limit the present invention. The scope of the present invention is limited only by the claims attached.

First Embodiment

Figure 1:
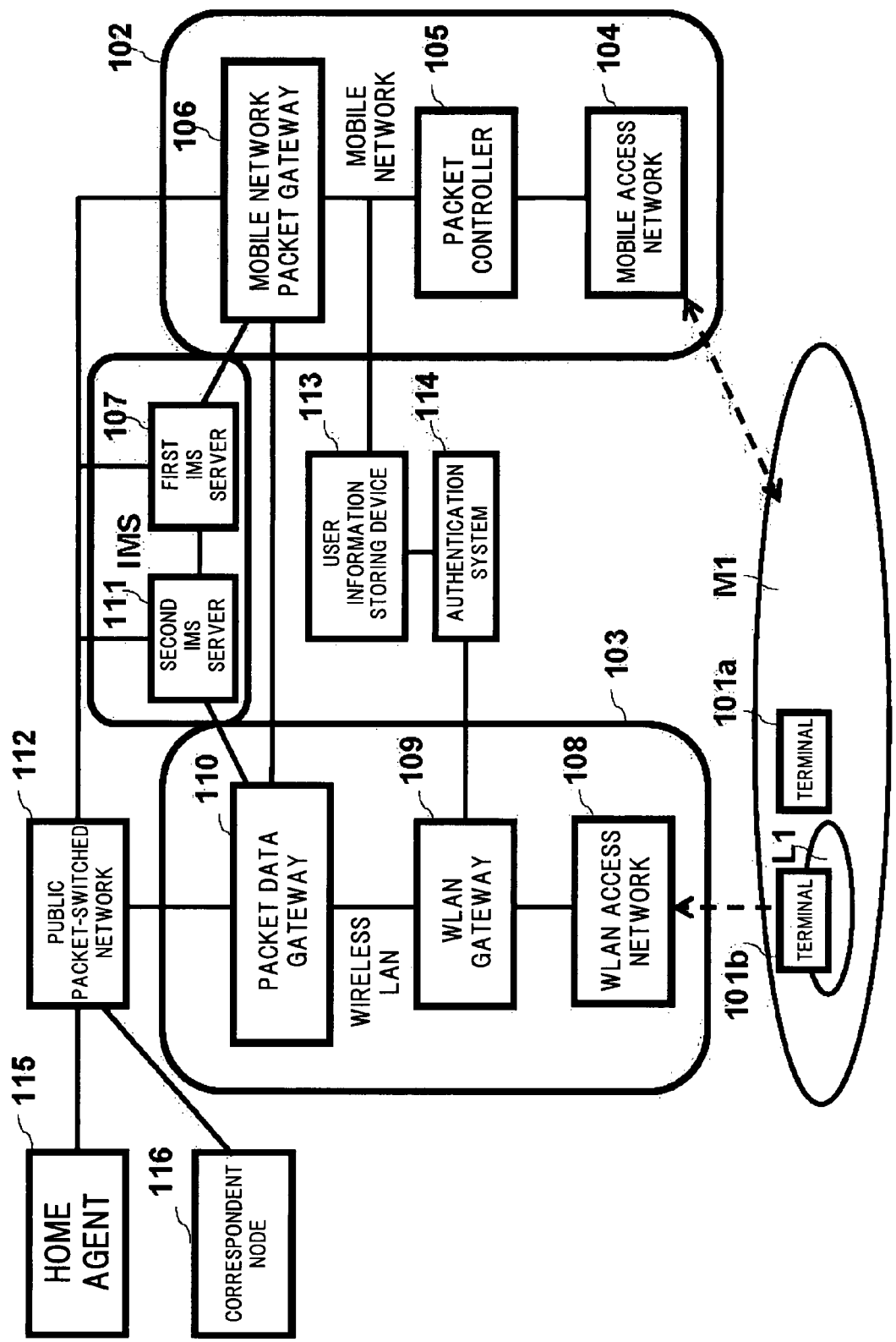
FIG. 1 is a block diagram showing a system configuration of an interworking system according to a first embodiment of the present invention.

FIG. 1 is a block diagram showing a system configuration of an interworking system according to a first embodiment of the present invention. In FIG. 1, a terminal 101a in an area M1 and a terminal 101b in an area L1 have an identical configuration and therefore they are sometimes collectively referred to as the terminal 101 herein. The terminal 101 in the first embodiment includes interfaces for communicating with a mobile network 102 and a wireless LAN 103. When communicating with the mobile network 102, the terminal 101 corresponds to UE (User Equipment) in 3GPP.

In the example shown in FIG. 1, the terminal 101a is in the area (M1) of the mobile network 102. The terminal 101b is in the area (L1) in which the terminal 101b can access both of the mobile network 102 and the wireless LAN 103. In the following description of the embodiment, a process will be described that is performed when the terminal 101 starts communication first in the position of the terminal 101a after registering the position, and then moves to the position of the terminal 101b.

The mobile network 102 is a (communication) network conforming to a mobile communication standard such as GSM, GPRS, or W-CDMA. It is assumed in this embodiment that the mobile network 102 is the home network of the terminal 101. The term "home network" as used herein refers to a network where the user of the terminal 101 has a service agreement and the term "visited network" refers to a network to which a cell where the terminal 101 is located belongs.

The mobile network 102 includes a mobile access network 104, a packet controller 105, and a mobile network packet gateway 106. The mobile access network 104 has a wireless interface of the mobile network 102 and transmits data of the mobile network 102. The mobile access network 104 corresponds to UTRAN of 3GPP. The packet controller 105 performs GPRS connection setup for the terminal 101. The packet controller 105 corresponds to SGSN of 3GPP. The mobile network packet gateway 106 corresponds to GGSN of 3GPP. The mobile network packet gateway 106 relays packets between the mobile network 102 and a public packet-switched network 112.

The wireless LAN 103 has a wireless LAN interface such as an IEEE 802.11/11a/11b/11g/11n or HIPERLAN wireless LAN interface and transmits packets. The wireless LAN 103 includes a WLAN access network 108, a WLAN gateway 109, and a packet data gateway 110.

The WLAN access network 108 provides wireless LAN connection to the terminal. The WLAN access network 108 corresponds to WLAN AN (Access Network) of 3GPP. The WLAN gateway 109 is connected to the WLAN access network 108 and relays packets that have access to the mobile network 102. The packet data gateway 110 relays packets of the wireless LAN to the public packet-switched network 112.

A first IMS server 107 performs IMS call control processing relating to terminals located in the mobile network 102. The first IMS server 107 corresponds to S-CSCF (Serving-CSCF) of 3GPP. A second IMS server 111 connected to the first IMS server 107 relays signals concerning IMS call control processing relating to terminals located in the wireless LAN 103. The second IMS server 111 corresponds to P-CSCF of 3GPP. The first IMS server 107 and the second IMS server 111 are sometime collectively referred to simply as the IMS server or servers herein.

A user information storing device 113 manages the connection status of the terminal 101. The user information storing device 113 corresponds to HLR (Home Location Register) or HSS (Home Subscriber Server) of 3GPP. An authentication system 114 is connected to the user information storing device 113 and relays a signal for authentication between the user information storing device 113 and the WLAN gateway 109 when authentication requested from the wireless LAN is performed. The authentication system 114 corresponds both or one of AAA Prosy and AAA Server of 3GPP.

The public packet-switched network 112 is connected with the mobile network 102 and the wireless LAN 103. The public packet-switched network 112 is a public network that performs packet switching. The public packet-switched network 112 corresponds to PDN (Packet Data Network) of 3GPP. Connected to the public packet-switched network 112 are a home agent 115, which is a router supporting movement of mobile nodes, and a correspondent node 116. The home agent 115 is a home agent of Mobile IP. The correspondent node 116 performs communication with the terminal 101.

Figure 2:
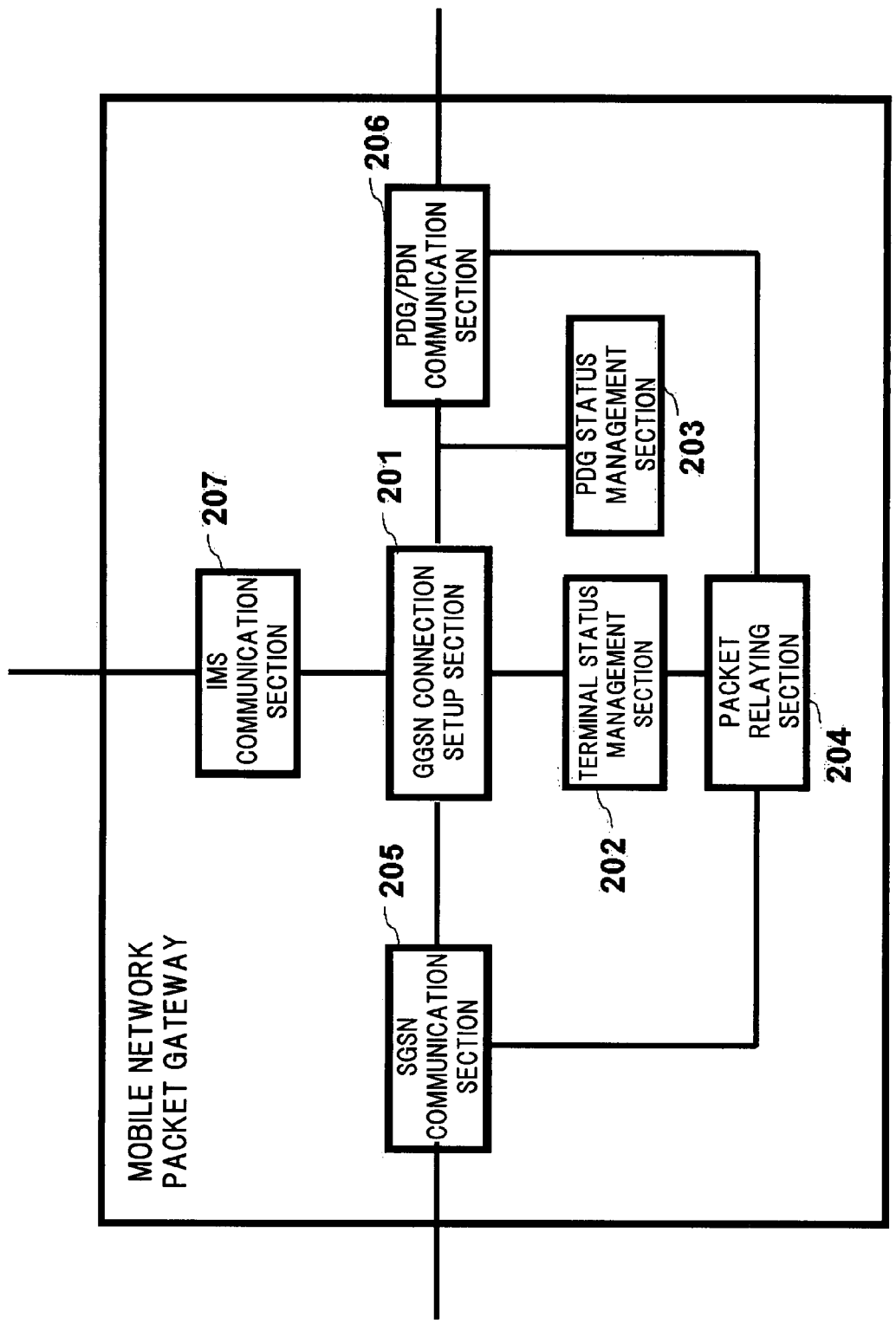
FIG. 2 is a block diagram showing an internal configuration of a mobile network packet gateway in the first embodiment of the present invention.

FIG. 2 is a block diagram showing an internal configuration of the mobile network packet gateway 106. In FIG. 2, a GGSN connection setup section 201 performs connection setup concerning the terminal 101 that uses the mobile network packet gateway 106. A terminal status management section 202 manages the status of connection relating to the terminal 101 that uses the mobile network packet gateway 106. A PDG status management section 203 obtains and manages the operation status information such as the load on the packet data gateway 110. A packet relaying section 204 inputs and outputs packet data between the mobile network packet gateway 106 and the packet controller 105, the packet data gateway 110, and the public packet-switched network 112.

An SGSN communication section 205 performs protocol processing of communication with the packet controller 105, and inputs and outputs communication data to and from the packet controller 105. A PDG/PDN communication section 206 inputs and outputs packets to and from the packet data gateway 110 and the public packet-switched network 112. It is assumed in this embodiment that the mobile network packet gateway 106 is connected with the packet controller 105, packet data gateway 110, and public packet-switched network 112 through IP. An IMS communication section 207 communicates call control data between the mobile network packet gateway 106 and the "IMS server".

Figure 3:
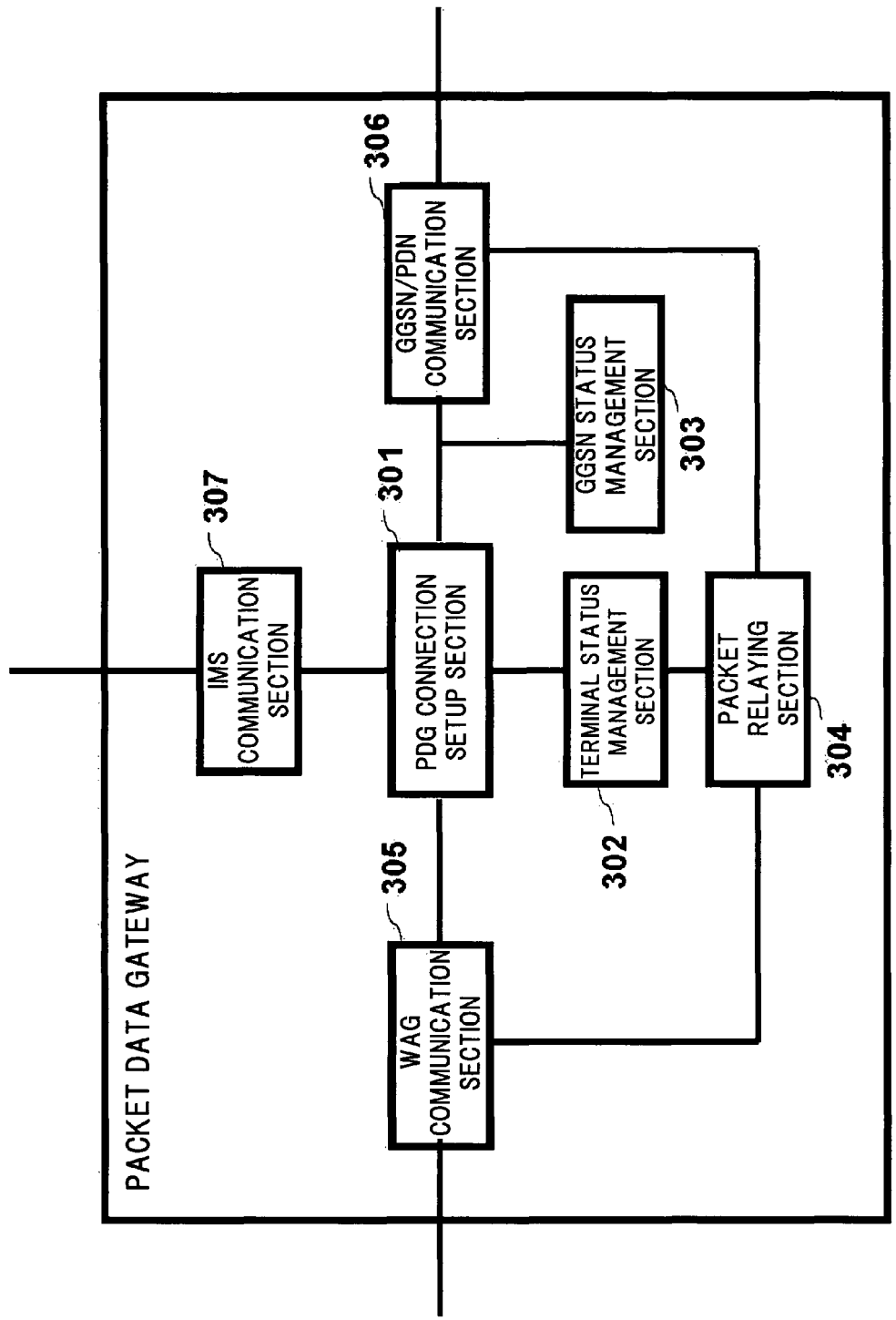
FIG. 3 is a block diagram showing an internal configuration of a packet data gateway in the first embodiment of the present invention.

FIG. 3 is a block diagram showing an internal configuration of the packet data gateway 110. In FIG. 3, a PDG connection setup section 301 performs connection setup relating to the terminal 101 that uses the packet data gateway 110. A terminal status management section 302 manages the status of connection relating to the terminal 101 that uses the packet data gateway 110. A GGSN status management section 303 performs protocol processing of communication with the mobile network packet gateway 106, and inputs and outputs communication data to and from the mobile network packet gateway 106. A packet relaying section 304 inputs and outputs packet data between the packet data gateway 110 and the WLAN gateway 109, the mobile network packet gateway 106, and the public packet-switched network 112.

A WAG communication section 305 performs protocol processing for communication with the WLAN gateway 109, and inputs and outputs communication data to and from the WLAN gateway 109. A GGSN/PDN communication section 306 inputs and outputs packets to and from the mobile network packet gateway 106 and the public packet-switched network 112. It is assumed that the packet data gateway 110 is connected with the mobile network packet gateway 106 and the public packet-switched network 112 through IP. An IMS communication section 307 communicates call control data between the mobile network packet gateway 106 and the IMS server.

Figure 4:
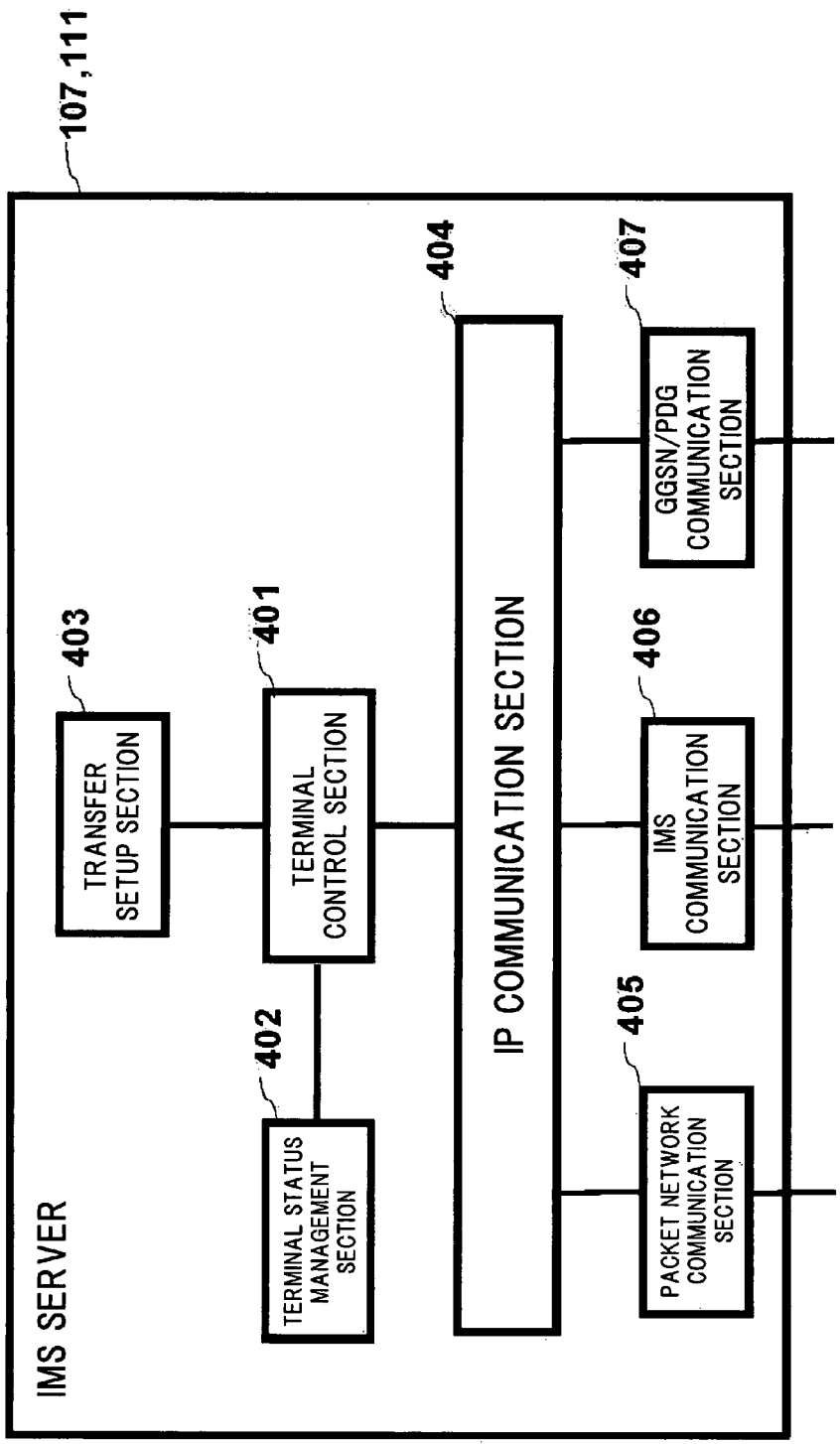
FIG. 4 is a block diagram showing an internal configuration of an IMS server in the first embodiment of the present invention.

FIG. 4 is a block diagram showing an internal configuration of the IMS server. In FIG. 4, a terminal control section 401 performs connection setup relating to the terminal 101 that uses the IMS server. A terminal status management section 402 manages the status of call control relating to the terminal 101 that uses the IMS server. A transfer setup section 403 performs setup for transferring a call control message in accordance with the terminal 101. An IP communication section 404 performs IP transfer and Mobile IP processing.

A packet network communication section 405 provides communication with the public packet-switched network 112. An IMS communication section 406 provides communication with another IMS server. A GGSN/PDG communication section 407 inputs and outputs packets to and from the mobile network packet gateway 106 and the packet data gateway 110. It is assumed that the IMS server is connected with each of the mobile network packet gateway 106 and the packet data gateway 110 through IP.

Figure 5:
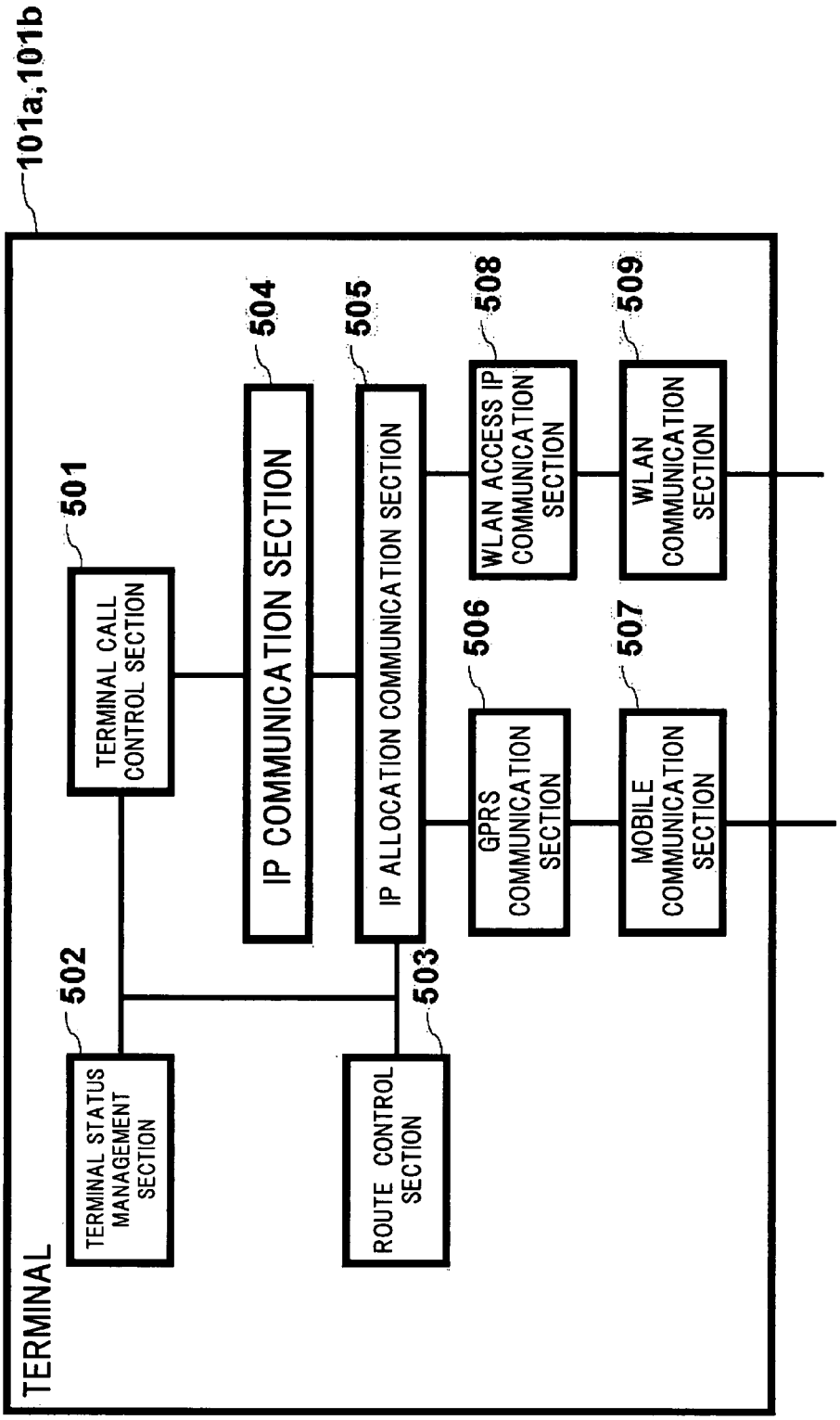
FIG. 5 is a block diagram showing an internal configuration of a terminal in the first embodiment.

FIG. 5 is a block diagram showing an internal configuration of the terminal 101. In FIG. 5, a terminal call control section 501 has the functions of performing call control concerning the terminal 101, generating a message to the IMS server, and performing IMS and SIP protocol processing. A terminal status management section 502 manages various states concerning the terminal 101. A route control section 503 determines an appropriate transmission route in accordance with an application or connection. An IP communication section 504 performs IP communication directed to the terminal 101. An IP allocation communication section 505 refers to the terminal status management section 502 to allocate packets and determine the destinations of packets in accordance with the type of a network.

A GPRS communication section 506 performs protocol processing relating to GPRS. A mobile access network communication section 507 communicates with the mobile access network 104 and performs radio communication control. A WLAN access IP communication section 508 communicates with the packet data gateway 110 using an access IP address for accessing a wireless LAN. A WLAN communication section 509 communicates with the WLAN access network 108.

Figure 8:
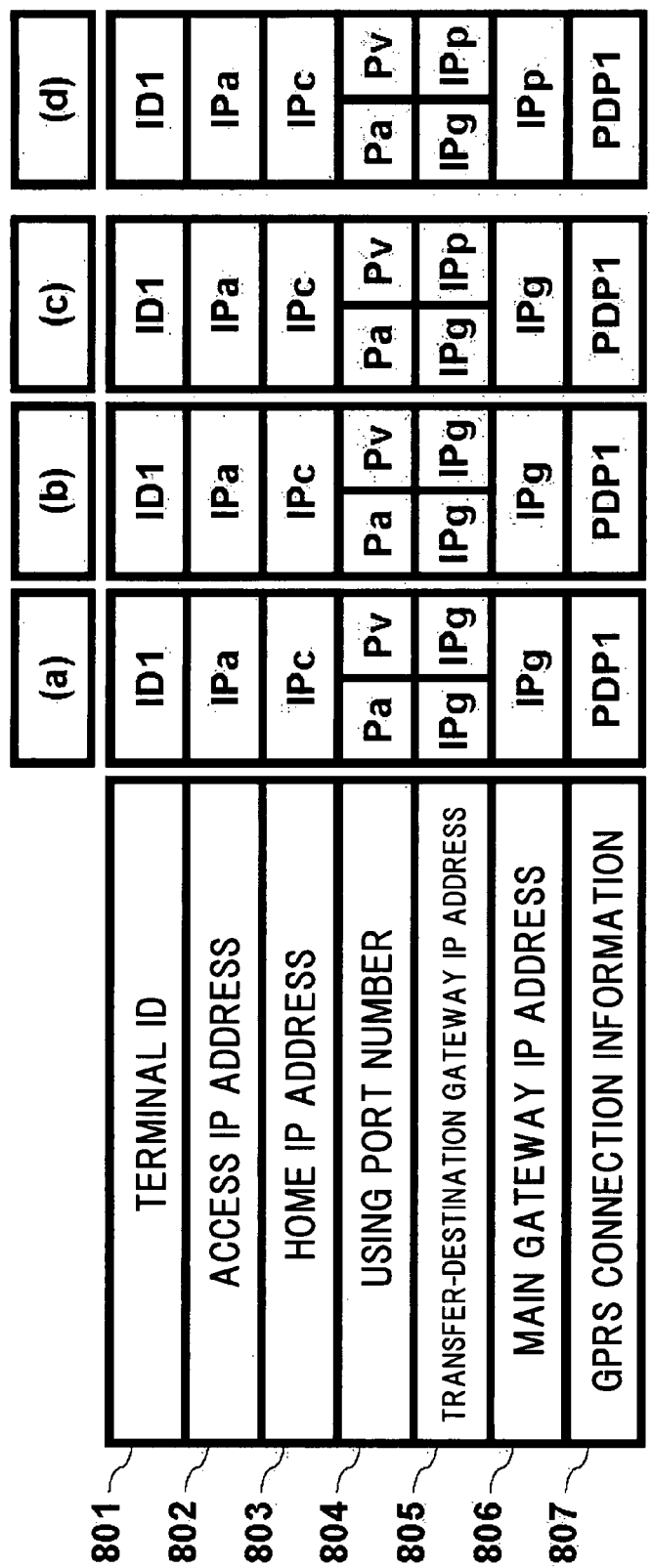
FIG. 8 is a field diagram showing data in a terminal status management section of the packet data gateway in the first embodiment of the present invention.
Figure 9:
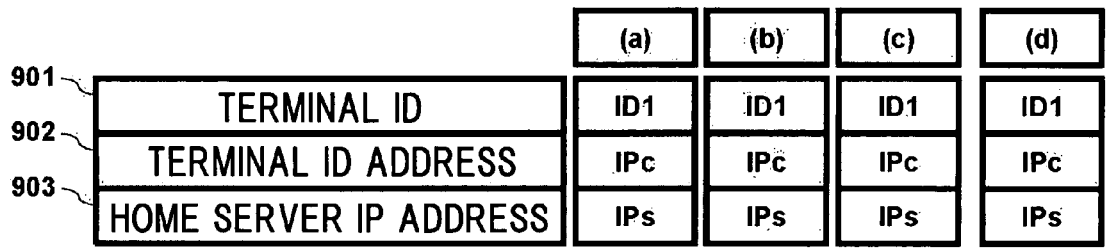
FIG. 9 is a field diagram showing data in a terminal status management section of a first IMS server in the first embodiment of the present invention.
Figure 10:
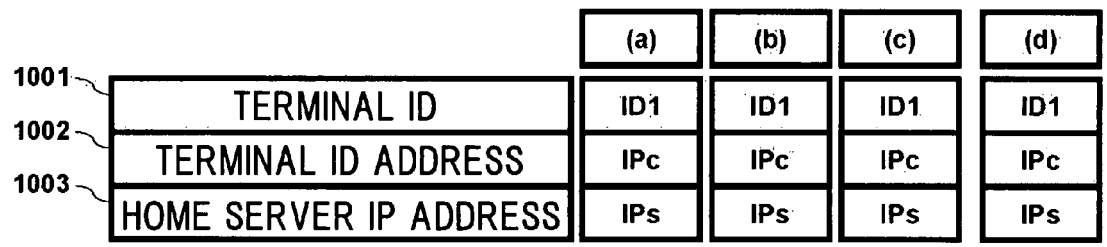
FIG. 10 is a field diagram showing data in a terminal status management section of a second IMS server in the first embodiment of the present invention.
Figure 11:
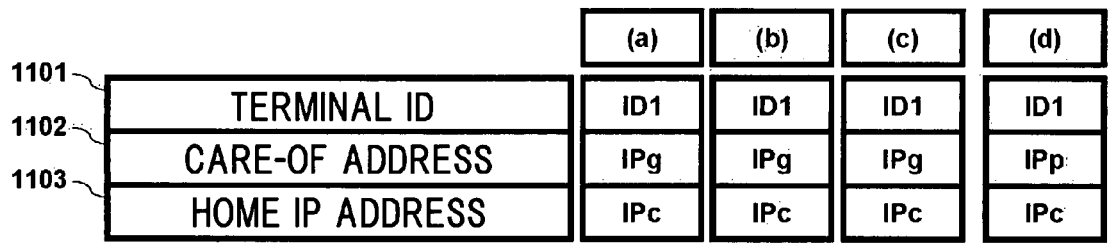
FIG. 11 is a field diagram showing data in a terminal status management section of a home agent in the first embodiment of the present invention.

FIG. 6 is a field diagram showing data in the terminal status management section of the terminal 101; FIG. 7 is a field diagram showing data in the terminal status management section of the mobile network packet gateway 106; FIG. 8 is a field diagram showing data in the terminal status management section of the packet data gateway 110; FIG. 9 is a field diagram showing data in the terminal management section of the first IMS server 107, FIG. 10 is a field diagram showing data in the terminal status management section of the second IMS server 111; and FIG. 11 is a field diagram showing data in the terminal management section of the home agent 115.

Meanings of addresses and other data shown in the field diagrams of FIGS. 6 to 11 will be described below.

A "Terminal ID" (601, 701, 801, 901, 1001, 1101) is an identifier uniquely identifying a terminal. The terminal ID may be an IMSI, NAI (Network Access Identifier), SIP URI, or SIP URL.

An "Access IP address" (605, 606, 702, 802) is an IP address used when the terminal 101 accesses the mobile network 102 or the wireless LAN network 103. In this embodiment, the home agent 115 exists outside the mobile network 102 and the wireless LAN 103. Therefore, the possibility that the home agent 115 can route in both of the networks by using a home IP address (which will be described later) handled by the home agent 115 is not ensured. In order that the terminal 101 can access a network, the terminal must obtain an access IP address with which routing can be performed in the access network from the network to which the terminal 101 is attempting to access.

A "Home IP address" (607, 703, 803, 1103) is an IP address used by a terminal 110 to access a node external to the mobile network 102 and the wireless LAN 103. In this embodiment, when the terminal 101 accesses an external node, a home IP address is used in order to provide mobility transparency of the terminal 101 to both of the mobile network 102 and the wireless LAN 103. It is assumed in this embodiment that the terminal 101 holds a home IP address beforehand. However, the terminal may obtain a home IP address when it starts access. The same effects as those of this embodiment can be obtained even in that case.

The "Number of port to use" (609, 704, 804) is a port number, such as a TCP, UDP, or SCTP port number, used by the terminal 101 for transmission of communication service. A port number is used for distinguishing between transmission paths in transmission to or from the same address. While only port numbers "Pa" and "Pv" are shown in the field diagrams by way of example, a default value can also be specified to indicate specification of a port number other than these port numbers. When "default" is specified in addition to "Pa" and "Pv" for example, it indicates all port numbers other than "Pa" and "Pv".

"Terminal status" 602 in FIG. 6 indicates the status of communication of a terminal and has three states: "Off", "Standby", and "In communication". "GPRS connection information" 603 is connection information concerning GPRS and corresponds to a PDP context of 3GPP TS 23.060. "WLAN connection information" 604 is information stored for connection to the wireless LAN 103. The "WLAN connection information" may include a WEP key, an ESS-ID, an authentication method, an authentication ID, a password for connecting to the WLAN access network 108, and an access IP address which is assigned to a terminal after connection is established. An "IMS server address" 608 is an address of an IMS server used by the terminal 101. An "IP address of gateway of network to use" 610 is the IP address of a gateway of either the mobile network 102 or the wireless LAN 103. The "IP address of gateway of network to use" is used for packet communication from the terminal 101 to the home agent 115. The "IP address of gateway of network to use" 610 is assigned for each "Number of port to use" 609.

A "Transfer-destination gateway IP address" (705, 805) in FIGS. 7 and 8 represents an address to which downlink packets (directed to the terminal 101) should be transmitted through a relevant port to use. The transfer-destination gateway IP address (705, 805) is assigned for each port number to use (704, 804). A main gateway IP address (706, 806) represents the IP address of a main gateway. The main gateway is a gateway to which a care-of address registered in the home agent of each terminal is assigned. In particular, the main gateway is a mobile network packet gateway or a packet data gateway. GPRS connection information (707, 807) is connection information concerning GPRS and corresponds to a PDP context in 3GPP.

A terminal IP address (902, 1002) in FIGS. 9 and 10 is the IP address of the terminal 101. A home server IP address (903, 1003) is the IP address of the IMS server of the home network of the terminal 101. It is assumed in this embodiment, that the home network of the terminal 101 is the mobile network 102 and the wireless LAN 103 is a visited network of the terminal 101.

A "Care-of address" 1102 in FIG. 11 is a care-of address used in Mobile IP. In mobile IPv4 assumed in this embodiment, a care-of address is the address of a gateway that is a Foreign Agent (FA).

Referring to FIGS. 12 to 17, operation of the system in this embodiment will be described below.

Figure 12:
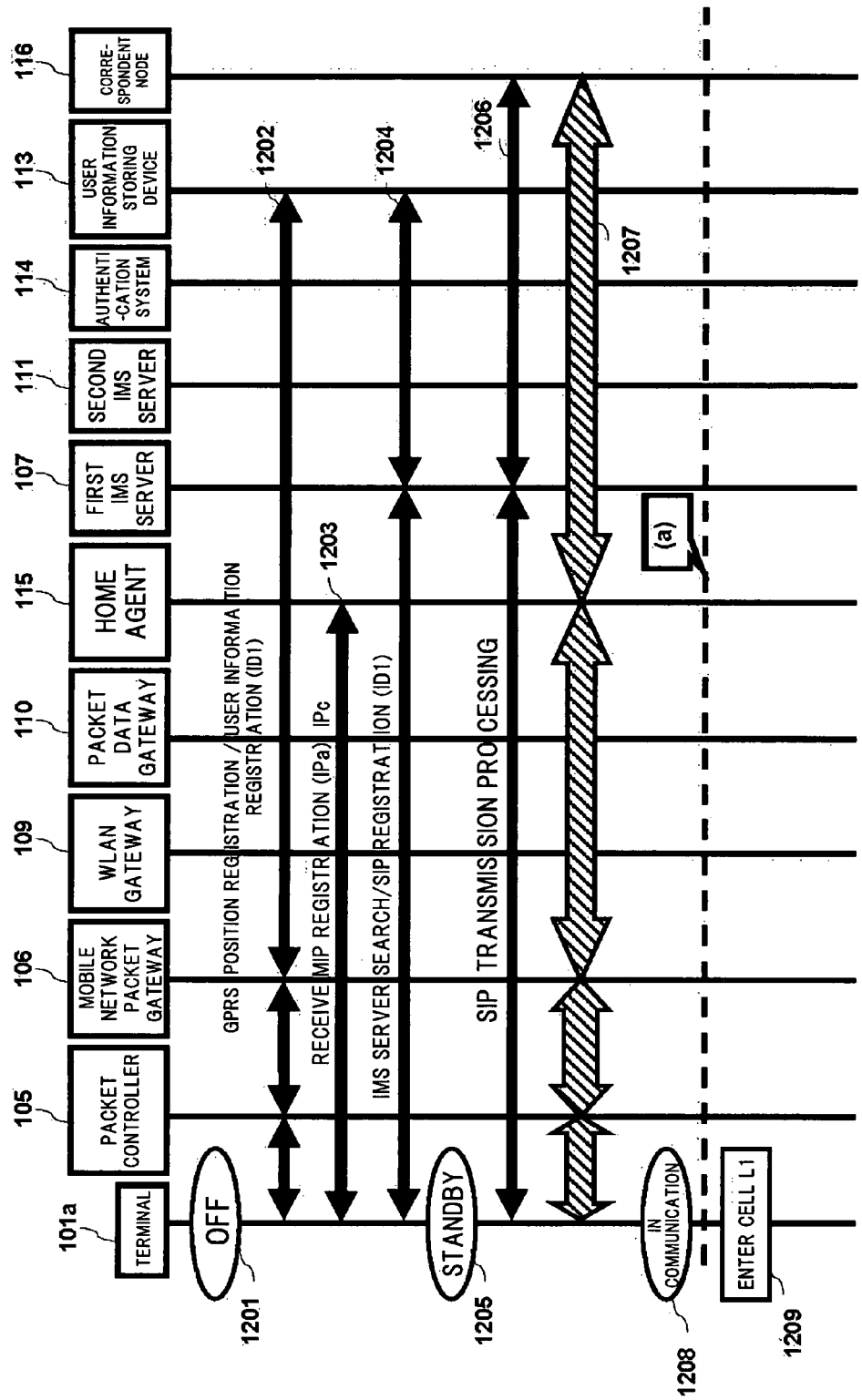
FIG. 12 is a sequence diagram showing a process sequence performed when the terminal is in a cell M1 in the first embodiment of the present invention.
Figure 13:
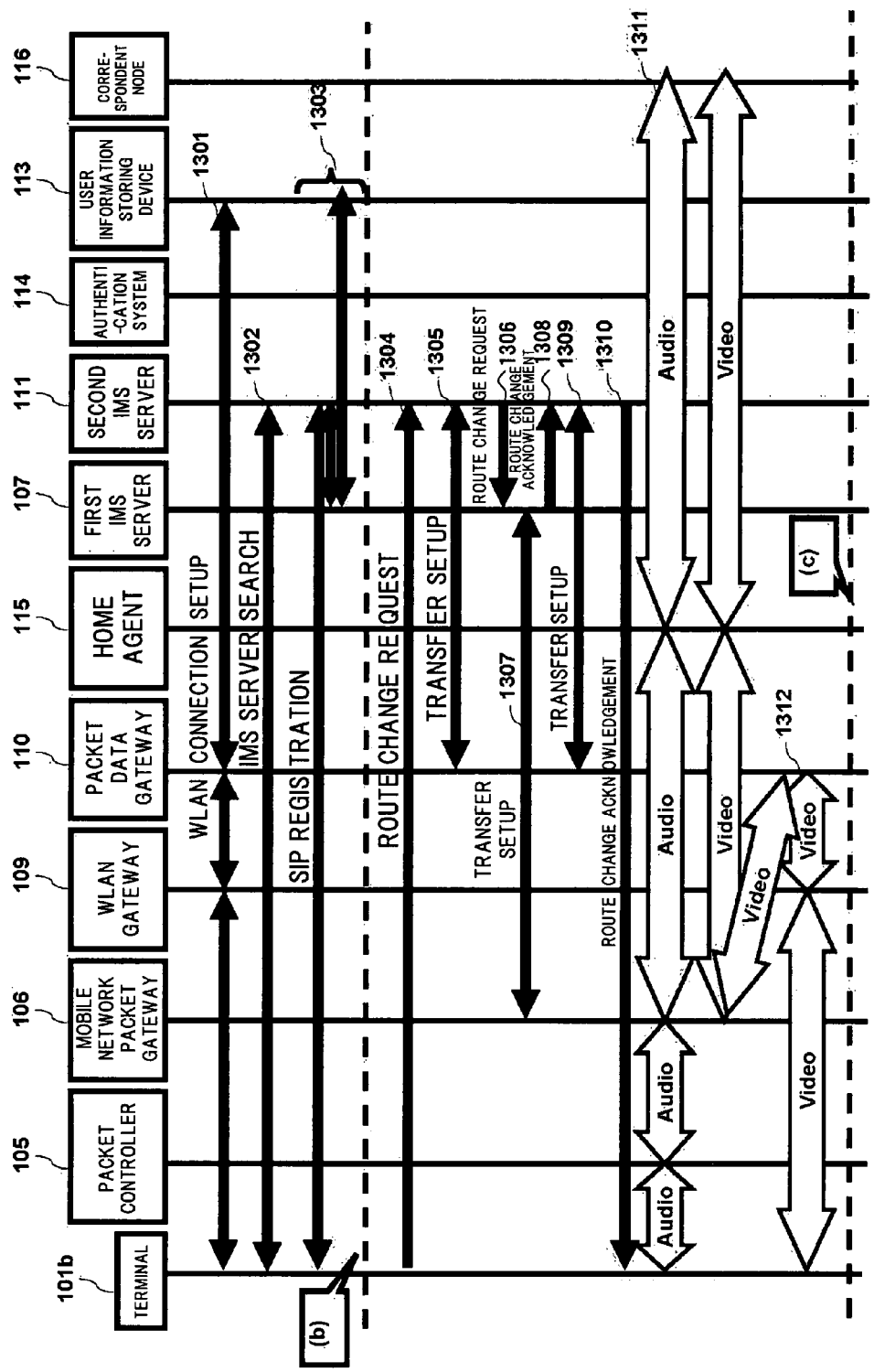
FIG. 13 is a sequence diagram showing a process sequence performed when the terminal moves to a cell L1 in the first embodiment of the present invention.

FIG. 12 is a sequence diagram showing a process sequence performed when the terminal 101 is in the cell M1 as the terminal 101a, and FIG. 13 is a sequence diagram showing a process sequence performed when the terminal 101a moves into the cell L1 and becomes terminal 101b.

Figure 14:
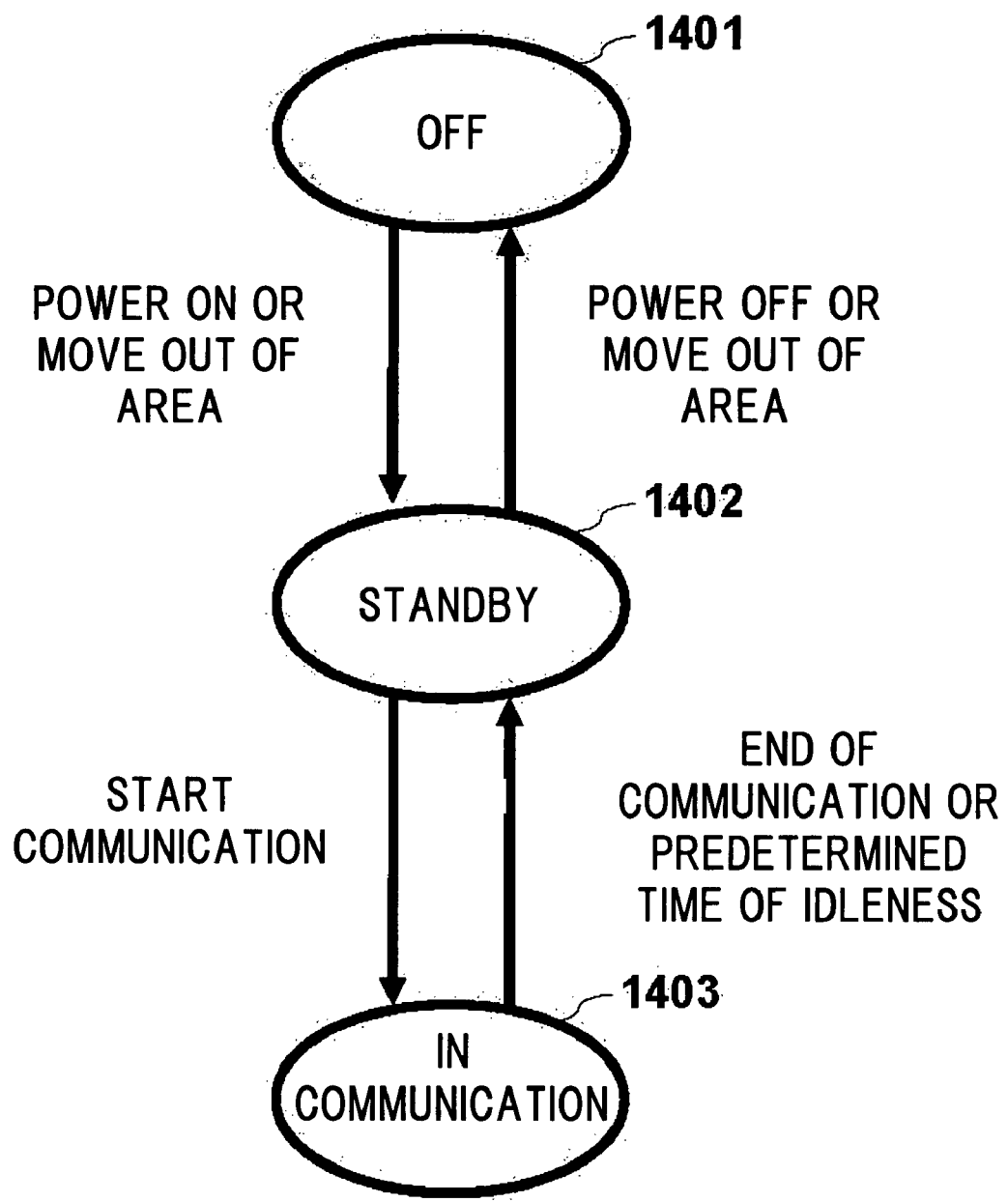
FIG. 14 is a diagram showing a state transition in the first embodiment of the present invention.

FIG. 14 is a diagram showing a state transition of the terminal 101 in this embodiment. As shown in FIG. 14, the terminal 101 can take any of three states, "Off" 1401, "Standby" 1402, and "In communication" 1403, depending on the power on/off of the terminal 101, an area in which the terminal 101 is located, and start/end of communication. The state of the terminal 101 is stored in the terminal status 602 fields in the terminal status management section 502.

Figure 15:
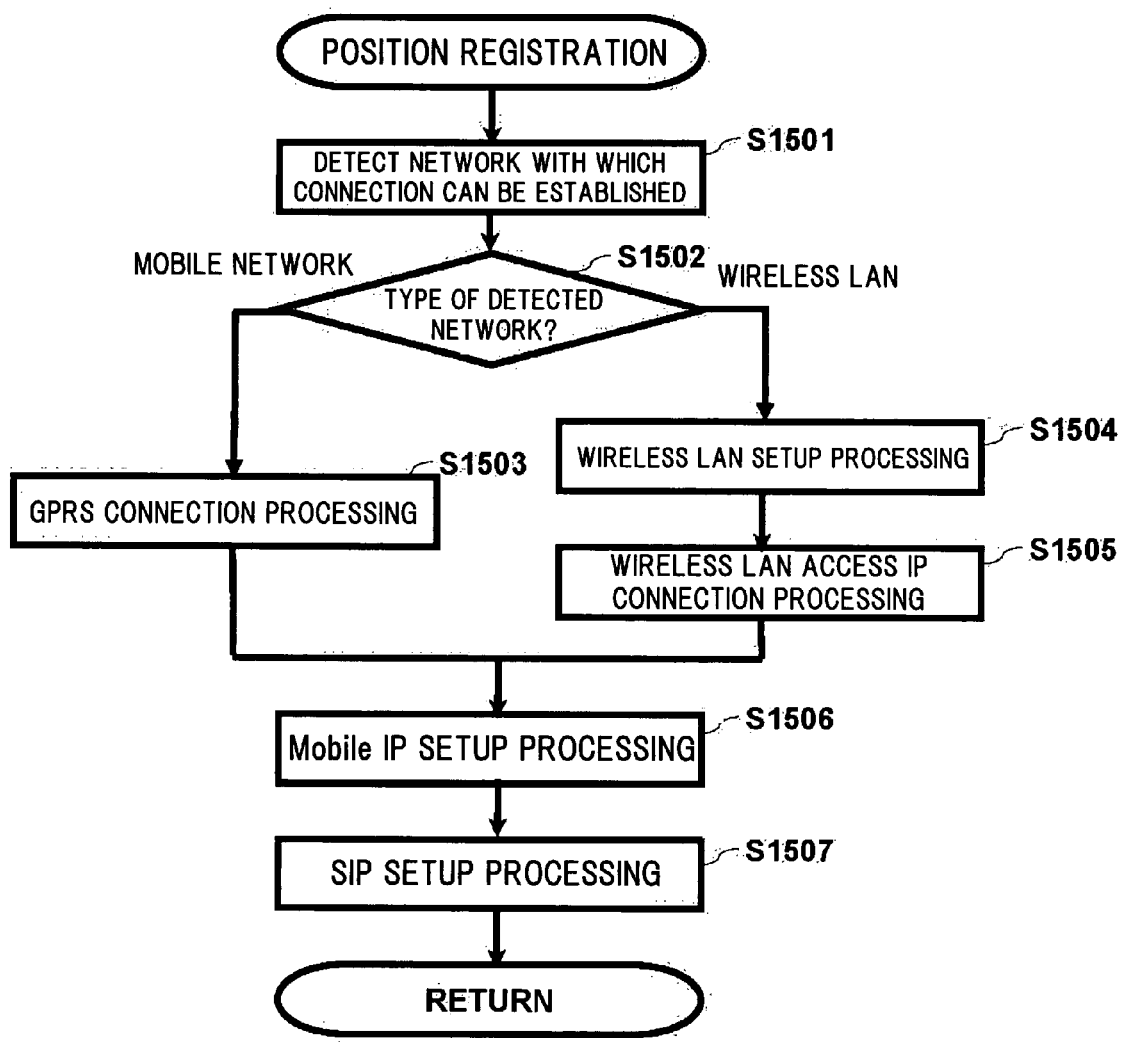
FIG. 15 is a flowchart illustrating operation performed by the terminal for registering its position in the first embodiment of the present invention.
Figure 16:
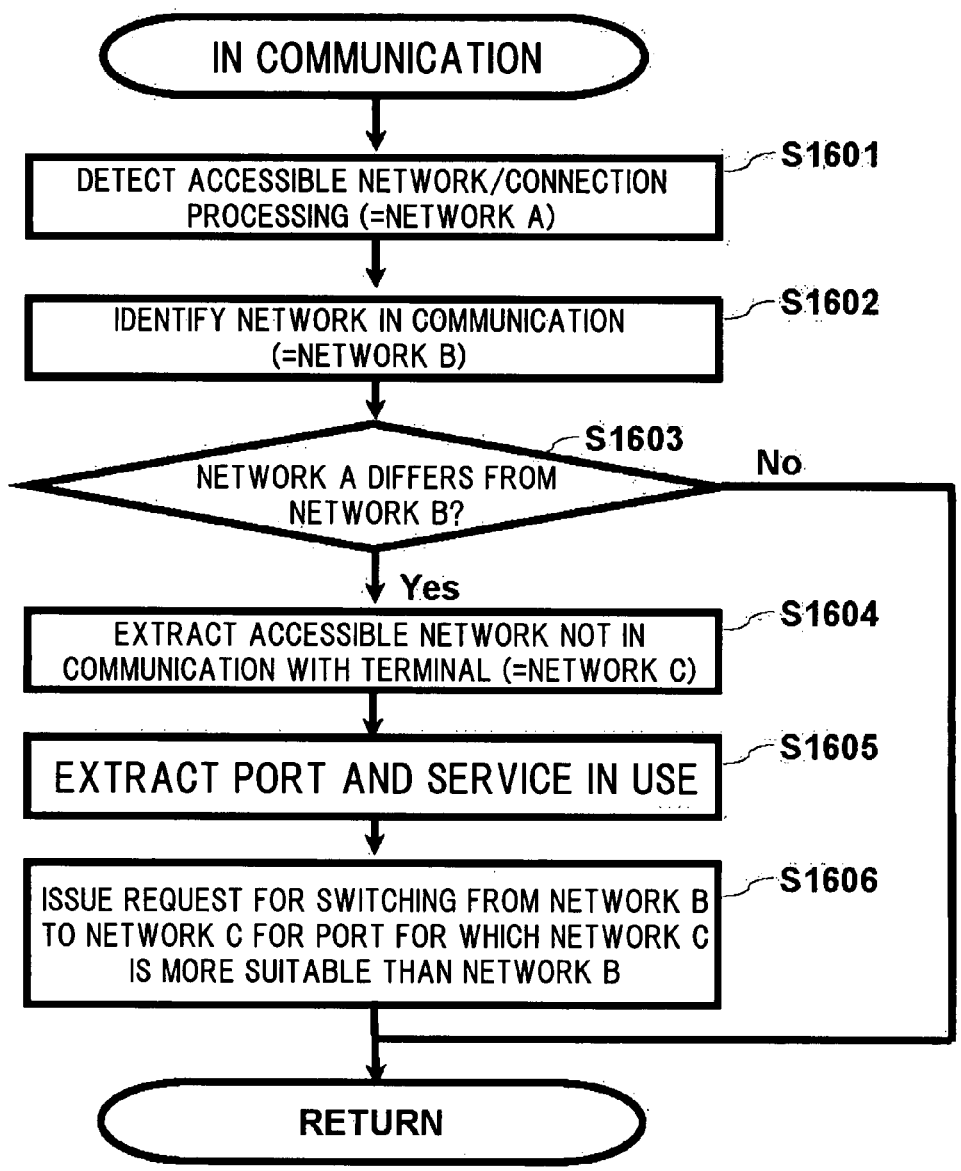
FIG. 16 is a flowchart illustrating operation performed by the terminal in communication in the first embodiment of the present invention.
Figure 17:
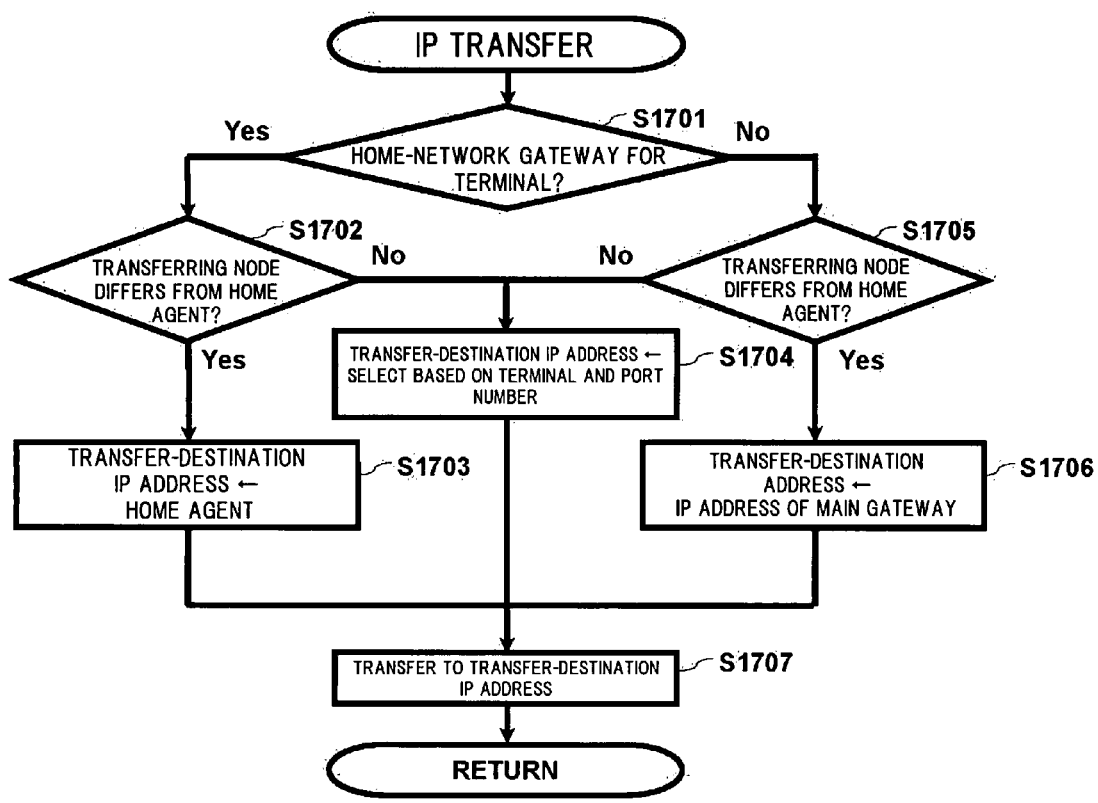
FIG. 17 is a flowchart illustrating operation for packet transfer performed by the mobile network packet gateway or the packet data gateway in the first embodiment of the present invention.

FIG. 15 is a flowchart for illustrating operation of the terminal 101 for registering the position of the terminal 101; FIG. 16 is a flowchart for illustrating operation of the terminal 101 in communication; and FIG. 17 is a flowchart for illustrating packet transfer operation of the mobile network packet gateway or the packet data gateway.

Referring to FIG. 12, a sequence when the terminal 101 is in the cell M1 as the terminal 101a will be described below. A state 1201 indicates that the terminal 101a is in the "Off" state 1401 (FIG. 14). When the terminal 101a is powered on by the user, the powered-on terminal 101a outputs a GPRS position registration/user information registration signal 1202. The terminal 101a performs steps S1501 through S1503 of the process for outputting the GPRS position registration/user information registration signal 1202 in FIG. 15. First, the terminal 101a performs detection of a network to which the terminal 101a can connect (step S1501). It is assumed here that the terminal 101a can communicate only with the mobile network 102. Then, the terminal 101a determines the type of the network it detected (step S1502). If the terminal 101a determines that the detected network is a mobile network, the terminal 101a proceeds to GPRS connection processing (step S1503). As a result of the processing, the position M1 of the terminal 101 is registered in the mobile network packet gateway 106.

In the GPRS connection processing (step S1503), the terminal 101a notifies the mobile network packet gateway 106 that the registration is the first network registration after the power on. The mobile network packet gateway 106 registers its own address IPg as the main gateway IP address for the terminal 101a. The terminal 101a obtains an access IP address IPa for accessing the mobile network 102 from the mobile network packet gateway 106. For obtaining the access IP address IPa, the following process is performed inside the terminal 101a.

When the terminal 101a is powered on, the GPRS communication section 506 of the terminal 101a starts GPRS position registration processing. The terminal 101a issues a request to the packet controller 105 and receives a response from the packet controller 105 through the mobile access network communication section 507. The GPRS communication section 506 in the terminal 101a performs packet communication with the mobile network packet gateway 106 of the mobile network 102. The GPRS communication section 506 is basically used in the GPRS position registration/user information registration 1202 because the same processing as GPRS protocol processing is performed. The position registration processing performed between the terminal 101a and the packet controller 105 involves ATTACH processing for registering the position and authentication processing. In 3GPP TS23.060, the position registration processing is performed by following the ATTACH request/Response/Accept/Complete, Identity Request/Response, and IMEI Check procedures.

In response to input of the GPRS position registration/user information registration signal 1202, the packet controller 105 performs GPRS connection setup. In the GPRS connection setup, the packet controller 105 generates a (primary) GPRS connection information (PDP context in 3GPP) for the packet controller 105 for the terminal 101 and starts management of the location of the terminal 101 in the mobile network 102. Also in the GPRS connection setup, the packet controller 105 performs position update processing (Location Update Request/Response in 3GPP), processing for generating (primary) GPRS connection information (Create PDP Context Request/Response in 3GPP) for connecting to the mobile network packet gateway 106, and processing for updating position (Routing Area Update in 3GPP) in the user information storing device 113.

When the GPRS position registration/user information registration signal 1202 is input, the mobile network packet gateway 106 generates (secondary) GPRS connection information (Secondary PDP context in 3GPP) and provides an access IP address IPa to the terminal 101a. The terminal 101a stores the access IP address IPa for accessing the mobile network 102 in the terminal status management section 502. The term "GPRS connection information" as used hereinafter refers to GPRS connection information for the mobile network packet gateway.

The access IP address IPa is assigned by a node, such as the public packet-switched network 112, external to the mobile network packet gateway 106 and transmitted to the terminal 101a over the mobile network packet gateway 106.

Here, inside the mobile network packet gateway 106, first a request from the terminal 101a is input into the SGSN communication section 205 through the packet controller 105. The request from the terminal 101a is concerning GPRS position registration. Accordingly, the GGSN connection setup section 201 generates GPRS connection information for the mobile network packet gateway for the terminal 101 and stores the information in the terminal status management section 202 as GPRS connection information 707.

Since the mobile network packet gateway 106 is the first gateway to which the terminal 101a is connected, the mobile network packet gateway 106 stores the IP address IPg of the mobile network packet gateway 106 as the main gateway IP address 706. The mobile network packet gateway 106 stores the access IP address IPa as the access IP address 702. After the GPRS connection information is generated, the GGSN connection setup section 201 generates a response and outputs the response to the packet controller 105 through the SGSN communication section 205.

The packet controller 105 receives the GPRS position registration/user information registration signal 1202 and registers the ID of the terminal 101a and the position (cell M1) in which the terminal 101a has connected in the user information storing device 113. Here, Update Location/Ack and Insert Subscriber Data messages in 3GPP are used. As a result of the process described above, the terminal 101a becomes able to perform communication using GPRS.

The terminal 101a outputs an MIP registration signal 1203. Before outputting the MIP registration signal 1203, the terminal 101a registers the access IP address IPa for accessing the mobile network 102 in the home agent 115 as a care-of address along with a home IP address in Mobile IP setup processing (step S1506). Before performing step S1506, the terminal 101a separately obtains the IP address of the home agent 115 and the home IP address of the terminal 101a and stores them in the terminal status management section 502 beforehand. For example, the terminal 101a may always holds the home IP address in the terminal status management section 502 or may separately perform authentication with the service provider of the home agent and may receive an home IP address after authentication.

After completion of GPRS communication setup by the GPRS communication section 506, the access IP address is provided to the terminal call control section 501 through the IP allocation communication section 505 and the IP communication section 504 inside the terminal 101a. The terminal call control section 501 registers the access IP address IPa in the terminal status management section 502 along with the ID of the terminal 101a (the terminal ID is ID1). After completion of the registration, the terminal call control section 501 generates an MIP registration signal 1203 which is a request for registering the terminal 101a with the home agent 115. The IP communication section 504 and the IP allocation communication section 505 generate an IP packet for external network and outputs the MIP registration 1203 request to the mobile access network 104 through the GPRS communication section 506 and the mobile access network communication section 507. In the subsequent process, all IP packets transmitted through the mobile network 102 are input and output through this route.

As shown in FIG. 12, the MIP registration 1203 request is input into the home agent 115 through the mobile access network 104, the packet controller 105, the mobile network packet gateway 106, and the public packet-switched network 112. The MIP registration 1203 request is a signal including Registration Request/Replay of Mobile IP.

The home agent 115 registers ID1 as the ID of the terminal 101, the access IP address IPa as the care-of address 1102, and registers the home IP address IPc as the home IP address 1103 in association with the access address IPa. After completion of the registration, the home agent 115 outputs a response to the terminal 101a indicating the successful registration. When this response is input, the terminal call control section 501 in the terminal 101a registers the set of the terminal ID of the terminal 101a, ID1, and the home IP address, IPc, in the terminal status management section 502.

IMS server search/SIP registration 1204 is a signal output by the terminal 101a to the first IMS server. Before outputting the IMS server search/SIP registration signal 1204, the terminal 101a performs SIP setup processing S1507 on completion of Mobile IP processing. By the IMS server search/SIP registration 1204, the terminal 101a searches for an IMS server associated with the mobile network 102. When the terminal 101a detects the IMS server, the terminal 101a stores the IP address of the IMS server in the terminal status management section 502. Here, the terminal 101a obtains the address IPs of the first IMS server 107 from the mobile network 102. The first IMS server 107 is an IMS server that controls terminals belonging to the mobile network 102.

3GPP TS23.228 (3GPP TS23.228 "IP Multimedia Subsystem (IMS); Stage 2") describing a specification of IMS discloses a mechanism that a DHCP server and a DNS server of the mobile network 102 cooperate to notify the IP address of the IMS server to the terminal 101a. An alternative way is to obtain the IP address of the IMS server from the mobile network packet gateway 106 or the packet controller 105.

The terminal 101a outputs the IMS server search/SIP registration signal 1204 to the first IMS server 107. The signal corresponds to Registration of IETF SIP. In order to output the IMS server search/SIP registration 1204, the following process is performed inside the terminal 101a.

When the terminal call control section 501 obtains the IP address IPs of the first IMS server 107, the terminal call control section 501 generates an SIP registration request and outputs it to the mobile network 102 in order to perform processing for registering in the first IMS server 107. In the IMS server search/SIP registration 1204 processing, the terminal 101a performs SIP registration with the first IMS server

107. As a result, an ID of the user and the home IP address IPc of the terminal 101a are registered in the user information storing device 113. In TS23.228, Cx-Put/Cx-pull is used to output "public user identity" (in the form of telephone number, SIP URI of RFC3261, or tel URL of RFC 2806), "private user identity" (in the form of NAI), and "S-CSCF name".

Inside the first IMS server 107, first the GGSN/PDG communication section 407 analyzes up to the MAC layer (Media Access control layer) which is part of the data link layer, and the IP communication section 404 performs IP protocol processing. When the IMS server search/SIP registration 1204 is input, the terminal control section 401 analyzes the message. Since this is SIP registration with the home network, the terminal control section 401 registers ID1, the home IP address IPc, and the IP address IPs of the first IMS server 107 as the set of a terminal ID 901, terminal IP address 902, and home server IP address 903 input in the terminal status management section 402. Then, the terminal control section 401 outputs a response to the terminal 101a through the IP communication section 404 and the GGSN/PDG communication section 407 indicating the completion of the registration. In the terminal 101a, the IP address IPs of the first IMS server 107 is registered in the IMS server address field 608 in the terminal status management section 502.

In the terminal 101a, with completion of registration of the SIP registration of the IMS server search/SIP registration 1204, the sequence of processing shown in FIG. 15 ends and the terminal 101a enters in the "Standby" state 1402 (FIG. 14) at (state 1205). Here, the terminal call control section 501 in the terminal 101a updates the status in the terminal status management section 502 to "Standby".

After the completion of the SIP registration, the terminal 101a performs SIP transmission to a correspondent node (ID2) by using the first IMS server 107 in SIP transmission processing 1206. The transmission begins with an INVITE message of SIP and "Offer", "Reservation", "Ringing", "OK", and "ACK" messages are sent and received. These signals are relayed by the mobile network 102 and the first IMS server 107 and are output to the correspondent node.

Once the sequence of the processing is completed, the terminal 101a starts outputting a terminal data stream (signal 1207) to the IP address of the correspondent node obtained, as shown in FIG. 12. The terminal 101a also manages information indicating that transmission for the port Pa used for audio and the port Pv used for video are performed over the mobile network packet gateway 106 in the terminal status management section 502.

After completion of output of SIP transmission processing 1206, the terminal 101a enters the "In communication" state 1403 (FIG. 14) at state 1208. Here, the terminal call control section 501 in the terminal 101a updates the status in the terminal status management section 502 to "In communication" 1403. This point in time is denoted by "time (a)" and data stored in each node at this time point is shown in Column (a) in FIGS. 6 to 11.

Operation of the system according to the embodiment after the terminal 101a moves into the cell L1 and becomes the terminal 101b will be described with reference to the sequence diagram of FIG. 13 and the flowchart of FIG. 16.

FIG. 16 is a flowchart for illustrating a process from detection of a network to selection of the network in the "In communication" state 1403. At the beginning of the sequence shown in FIG. 13, the terminal 101a has moved to the cell L1 and become the terminal 101b in the last stage of FIG. 12, "Enter cell L1" 1209. In "Detect accessible network/Connection processing" (step S1601) of FIG. 16, the terminal 101b detects the wireless LAN 103 as a network to which the terminal 101b can connect, and performs the following process for connecting to the network, "Network A", in the step S1601.

In the WLAN connection setup 1301 shown in FIG. 13, the terminal 101b performs WLAN connection setup for connecting to the wireless LAN 103 where it has entered the cell L1. First, the WLAN access network 108 that has detected the terminal 101b performs WLAN connection setup and delivers a local IP address IPb to be used by the terminal 101b for connecting the wireless LAN access network 108. In the terminal 101b, communication processing with the WLAN access network 108 in the physical and MAC layers is performed by the WLAN communication section 509. The WLAN communication section 509 receives a beacon output from the WLAN access network 108 or detects an access point of the WLAN access network 108, and performs connection processing for connecting to the wireless LAN 103 and, if required, authentication processing.

If the wireless interface used by the wireless LAN 103 conforms to the IEEE 802.11 standard, Beacon and Prove Request/Response messages are used for the connection processing and Authentication Request/Response messages are used for the authentication processing. It should be noted that the NAI of the terminal may be used and/or the ID of the terminal in the authentication processing.

On completion of the connection processing up to the MAC layer, the WLAN communication section 509 obtains a local IP address IP1 in the wireless LAN network 103. The WLAN communication section 509 may obtain the local IP address at the same time as the authentication processing.

Inside the terminal 101b, the WLAN communication section 509 outputs its terminal ID according to an authentication procedure specified by the wireless LAN 103. The WLAN access network 108 performs authentication of the terminal ID. If it is determined as a result of the authentication that the terminal ID is that of the terminal 101b and the terminal is allowed to access the WLAN access network 108, the WLAN access network 108 responds and input the local IP address IP1 into the WLAN communication section 509. The local IP address IP1 is stored in the terminal status management section 502 as WLAN connection information 604.

When the terminal 101b becomes able to connect to the wireless LAN 103, the terminal 101b performs the sequence of processing shown in FIG. 16, that is, a process for selecting the network to connect during communication. In this case, it is determined that the port Pv used for video should be changed from the mobile network 102 to the wireless LAN 103.

The terminal 101b obtains an access IP address IPb for accessing the wireless LAN 103 through the packet data gateway 110 and stores the access IP address IPb in the terminal status management section 502 as the access IP address 606 for accessing the wireless LAN 103. The access IP address IPb is a remote IP address in the interworking specification defined in TS23.234 of 3GPP. After completion of the process, the terminal 101b can communicate with the packet data gateway 110 though the WLAN gateway 109.

Inside the terminal 101b, the WLAN access IP communication section 508 selects the wireless LAN 103 accessible from the WLAN access network and outputs an authentication request containing the terminal ID, ID1, to the authentication system 114. If the terminal 101b is permitted to communicate with the wireless LAN 103, an authentication response indicating the permission is input into the terminal 101b. Then, setup processing for providing a tunnel between the terminal 101b and the packet data gateway 110 is performed and communication is started. During this processing, WLAN connection information 604 is stored in the terminal status management section 502.

When the terminal 101b communicates with the wireless LAN 103 subsequently to the process described above, encapsulation for the WLAN access IP communication section 508 to communicate with the packet data gateway 110 is performed in the terminal 101b. The WLAN communication section 509 performs processing in the physical and MAC layers of the wireless LAN and the encapsulation using the local IP address in the wireless LAN 103. Hereinafter, when it is stated that "the terminal 101b communicates with the wireless LAN 103", it means that the physical and MAC layer processing and the encapsulation are performed in the terminal 101b.

The terminal 101b searches for an IP address IPp of the packet data gateway 110 by using a DNS server (not shown). Inside the terminal 101b, the WLAN access IP communication section 508 obtains the IP address IPp of the packet data gateway 110. With this, the terminal 101b becomes able to establish connection with the wireless LAN 103 and step S1601 will end.

In the step "Identify network in communication" (step S1602), the terminal 101b identifies the mobile network 102 with which the terminal 101b is communicating. This identified network is denoted by a "network B". Then, the network B with which the terminal 101b is communicating is compared with the network A to which the terminal 101b can connect to determine whether "network A differs from network B" (step S1603). Here, the network B in communication differs from the network A to which the terminal 101b can connect. Therefore the process proceeds to the step "Extract accessible network not in communication with terminal" (step S1604) and the processing at the step is performed. The comparison between the networks at step S1603 may be performed by obtaining an IP address IPg of the mobile network packet gateway 106 of the mobile network 102 as the address of the gateway being used and determination may be made that the IP address IPg differs from the IP address IPp of the packet data gateway 110 which is the gateway of the wireless LAN 103. Alternatively, an access IP address assigned to each network connected with the terminal 101 may be used to determine that the IPa associated with the mobile network 102 differs from the IPb associated with the wireless LAN 103.

At step S1604, a network is extracted that is not communicating with the terminal 101b and to which the terminal 101b can connect. This network is denoted by a "network C". Here, the terminal 101b extracts the wireless LAN 103 as the network that meets the conditions.

Then, "Extract port and service in use" (step S1605) is performed to extract the port and service used by the terminal 101b for communication. The terminal 101b is using the port Pv for transmitting video and the port Pa for transmitting audio.

Step S1606 is the step "Issue request for switching from the network B to the network C for port for which the network C is more suitable than Network B". In this step, network switching is performed for a port number of a service for which a new network (network C) to which the terminal 101b can connect through step S1604 has a higher priority than the network (network B) in communication with the terminal. It is assumed in this embodiment that the mobile network 102, which covers a wider area, is used for audio transmission using the port Pa and the wireless LAN 103, which has a wider bandwidth, is used for video transmission. Therefore, only the port Pv is switched to the wireless LAN 103.

A process for changing a transmission route for the port Pv will be described below. Search for an IMS server will be described first and then processing responsive to a switch request will be described.

In IMS server search 1302, the terminal 101b searches for an IMS server and obtains an address IPt of the second IMS server 111. The terminal 101b outputs an SIP registration signal 1303 for registering the terminal ID1. For this, the terminal 101b uses an SIP Registration message.

The communication process between the second IMS server 111 and the terminal 101b is the same as the process for obtaining the IP address of the first IMS server 107 performed in the first IMS server 107. However, in this case, the mobile network 102 is the home network of the terminal 101 and the wireless LAN 103 is a visited network. Since S-CSCF in the IMS specification of TS23.228 is the first IMS server 107, the second IMS server 111 performs P-CSCF operation. The second IMS server 111 first searches for an IMS server of the second IMS home network by using the user ID of the terminal 101b. As a result, the first IMS server 107 and its IP address IPs are found and connection is established between the second IMS server 111 and the first IMS server 107.

The following process is performed in the second IMS server 111. When the SIP registration 1303 message is input by the terminal 101a, the second IMS server 111 performs a process for registering SIP in the second IMS server 111. Inside the second IMS server 111, the GGSN/PDG communication section 407 first analyzes the message up to the MAC layer and the IP communication section 404 performs IP protocol processing. In the SIP registration 1303, the terminal control section 401 analyzes the message. Since this is SIP registration in a visited network, the terminal control section 401 passes the request to the transfer setup section 403.

The transfer setup section 403 cooperates with the user information storing device 113 through the IP communication section 404 and the GGSN/PDG communication section 407 to search for an IMS server of the home network by using the user ID as a key. The key may be the IMSI, the domain name extracted from the user ID, the address of GGSN, or the GGSN number, in stead of the user ID.

After completion of the search, the second IMS server 111 registers the IP address, IPs, of the first IMS server 107 in the terminal status management section 402 along with the user ID of the terminal 101b. Then, the second IMS server 111 provides a signal from the terminal 101b to the first IMS server 107. The first IMS server 107 registers the terminal 101b and provides a response to the second IMS server 111, as with the home network. The second IMS server 111 directly outputs the response to the terminal 101b. The terminal control section 501 in the terminal 101b stores the IP address IPt of the second IMS server 111 in the terminal status management section 502 as an IMS server address 608.

Subsequently, call control signals relating to IMS sent from the terminal 101b to the first IMS server 107 are transferred along the route passing through the wireless LAN 103 and the second IMS server 111. This point of time is denoted by "time (b)" and data stored in each node at time (b) is shown in column (b) in FIGS. 6 to 11.

The terminal 101b issues a route change request 1304 for changing the route through which a stream relating to the home IP address IPc concerning the video port Pv to the second IMS server 111. The route change request 1304 is a request for changing the address specifying the route of the stream from the IP address IPa for transmitting over the mobile network 102 to the IP address IPb of the packet data gateway 110 for transmitting over the wireless LAN 103.

Inside the terminal 101b, the terminal call control section 501 generates the route change request 1304 and sends it to the wireless LAN 103. The route change request 1304 contains the terminal ID of the terminal 101b, ID1, the home IP address, IPc, the terminal (access) IP address IPa before route change, the new terminal (access) IP address IPb after the route change, the IP address IPp of the gateway to which the stream is to be transferred, and the port number Pv. These information are obtained from 502.

When the route change request 1304 is input, the second IMS server 111 sends a transfer setup request 1305 in which the stream to be transferred and the transfer destination are specified to the packet data gateway 110. The second IMS server 111 transfers the route change request 1306 to the first IMS server 107 without change.

Inside the second IMS server 111, the route change request 1304 is input by the GGSN/PDG communication section 407. The terminal control section 401 analyzes the route change request 1304 detected at the IP communication section 404 and finds that the request is a route change request. The terminal control section 401 uses the IP communication section 404 and the IMS communication section 406 to sends the route change request 1304 to the first IMS server 107 that has the home server IP address IPs.

When the route change request 1306 is input from the second IMS server 111, the first IMS server 107 searches for the mobile network packet gateway 106 on the basis of the terminal ID, ID1, or the IP address IPa before route change and outputs a transfer setup request 1307. In the first IMS server 107, the route change request 1306 is input through the IMS communication section 406 and the IP communication section 404. The terminal control section 401 analyzes the route change request 1306 to extract the current terminal IP address IPa before route change, the new terminal IP address IPb after the route change, the IP address IPp of the transfer-destination gateway, the port number Pv, and the terminal ID, ID1.

Since the gateway between the terminal 101 and the public packet-switched network is the mobile network packet gateway 106, the terminal control section 401 generates a transfer setup request 1307 for requesting transfer change, containing the terminal ID, ID1, the current terminal IP address IPa before route change, the IP address IPp of the transfer-destination gateway, and the port number Pv included in the route change request 1306. The terminal control section 401 outputs the transfer setup request 1307 to the mobile network packet gateway 106 through the IP communication section 404 and the GGSN/PDG communication section 407.

When the transfer setup request 1307 for requesting transfer change is input, the mobile network packet gateway 106 compares the IP address of the transfer-destination gateway contained in the signal with the IP address of itself. Since the IP address IPp of the transfer-destination gateway differs from the IP address IPg of the main gateway 707 in this case, the address set in the transfer-destination gateway IP address 705 field is changed to IPp for the port Pv specified in the signal.

When the transfer setup request 1307 is input in the GGSN connection setup section 201 through the IMS communication section 207 in the mobile network packet gateway 106, the GGSN connection setup section 201 searches the terminal status management section 302 for the main gateway IP address 706 on the basis of the terminal ID, ID1. Because the specified transfer-destination gateway IP address IPp differs from IPg in the main gateway IP address 706 field, the GGSN connection setup section 201 adds the using port number Pv and the transfer-destination IP address IPp to the terminal status management section 202. The GGSN connection setup section 201 outputs a signal acknowledging the transfer change to the first IMS server 107 through the IMS communication section 207. It should be noted that if the specified transfer-destination gateway IP address is the same as the main gateway IP address 706 and there is an entry associated with the port specified in the signal, the entry is deleted.

On completion of the transfer setup process, the first IMS server 107 sends a route change acknowledgement 1308, which is a response to the route change request, to the second IMS server 111. The terminal control section 401 of the first IMS server 107 generates the route change acknowledgement 1308 containing information (for example the terminal ID or an identifier uniquely assigned to the message) for associating the acknowledgement 1308 with the route change request 1306, and outputs the acknowledgement 1308 to the terminal 101b through the IP communication section 404 and the GGSN/PDG communication section 407.

When the route change acknowledgement 1308 is input from the first IMS server 107, the second IMS server 111 performs a transfer change process in response to a transfer setup 1309 of the packet data gateway 110 which is a gateway of the network to which the second IMS server 111 belongs. As a result, settings of the packet data gateway 110 are changed.

When a signal for requesting transfer change is input in the transfer change process in response to the transfer setup 1309, the packet data gateway 110 compares the IP address of the transfer-destination gateway in the signal with the IP address of the packet data gateway 110. In this case, the IP address of the transfer-destination gateway, IPp, differs from the IP address, IPg, of the main gateway 807, the packet data gateway 110 changes the address set in the transfer-destination gateway IP address 805 field for the port Pv specified in the signal to the IPp.

When the transfer setup request 1307 is input in the GGSN connection setup section 201 through the IMS communication section 207 in the mobile network packet gateway 106, the GGSN connection setup section 201 searches the terminal status management section 302 for the main gateway IP address 806 on the basis of the terminal ID, ID1. Because the specified transfer-destination gateway IP address IPp differs from the IPg in the main gateway IP address 806 field, the GGSN connection setup section 201 adds the using port number Pv and the transfer-destination IP address IPp to the terminal status management section 202. The GGSN connection setup section 201 outputs a signal for acknowledging the transfer change to the first IMS server through the IMS communication section 207. It should be noted that if the specified transfer-destination gateway IP address is the same as the main gateway IP address 806 and there is an entry associated with the port specified in the signal, the entry is deleted.

After the completion of the setting of the packet data gateway 110, the second IMS server 111 outputs a route change acknowledgement 1310 to the terminal 101. The terminal control section 401 of the second IMS server 111 generates a route change acknowledgement 1308 containing information (for example the terminal ID or an identifier uniquely assigned to the message) for associating the acknowledgement 1308 with the route change request 1304. The terminal control section 401 outputs the route change acknowledgement 1308 to the terminal 101b through the IP communication section 404 and the GGSN/PDG communication section 407.

On completion of the process, the terminal 101b stores the set of the port Pv and the IP address IPp for accessing the port Pv in the terminal status management section 502.

With this, the switching process will end. Subsequently, IP packet transfer 1311 relating to audio data and IP packet transfer 1312 relating to video data are performed between the mobile network packet gateway 106 and the packet data gateway 110 as follows.

FIG. 17 is a flowchart for illustrating packet transfer operation performed by the mobile network packet gateway 106 and the packet data gateway 110 in the embodiment. The process flow will be described with respect to three cases.

A first case relates to packet transfer operation from the terminal 101*b* to the correspondent node 116 and is a process performed in the mobile network packet gateway 106. Because the mobile network packet gateway 106 is the main gateway for the terminal 101*b*, determination at step S1701 as to whether the gateway is the home network gateway of the terminal 101*b* is "Yes" and the process proceeds to step S1702. At step S1702, determination is made as to whether the node from which the transfer is performed is a home agent. Because the transferring node is the terminal 101, the determination is "Yes" and the process proceeds to step S1703, where the transfer-destination IP address is set to the IP address of the home agent.

A second case relates to packet transfer operation from the terminal 101*b* to the correspondent node 116 and is a process performed in the packet data gateway 110. The packet data gateway 110 is the gateway of the wireless LAN 103, which is a visited network for the terminal 101*b*. Accordingly, determination at step S1701 is "No" and the process proceeds to step S1705. At step S1705, determination is made as to whether the transferring node is a home agent. Because the transferring node is the terminal 101*b*, the determination is "Yes" and the process proceeds to step S1706, where the transfer-destination IP address is set to the IP address of the main gateway. The transfer-destination IP address in this case is the IP address of the mobile network packet gateway 106, IPg.

A third case relates to packet transfer operation from the correspondent node 116 to the terminal 101*b*. In this packet transfer, determination at both of steps S1702 and S1705 as to whether the transferring node matches the home agent will be "No" regardless of the position of the terminal. Consequently, the process proceeds to step S1704, where the transfer-destination IP address is selected on the basis of the terminal and the port number. If the port number is Pv, the transfer-destination IP address is IPp; if the port number is Pa, the transfer-destination IP address is IPg.

In the terminal 101, the IP allocation communication section 505 selects the GPRS communication section 506 or the WLAN access IP communication section 508 as the communication section to use, on the basis of the IP address of the gateway of the network to use 610 associated with the port number to use 609 stored in the terminal status management section 502, and transfers IP packets to the IP address of the gateway of the network to use 610.

After the transfer-destination IP address is determined, step S1507 is performed and IP packets to be relayed are output to the transfer-destination IP address. This point of time is denoted by "time (c)" and data stored in each node at time (c) is shown in column (c) in FIGS. 6 to 11.

While the foregoing is description of processes for setting a branch of packet transmission when the terminal that is communicating with the mobile network 102 enters the wireless LAN 103, it will be understood that the embodiment described above can be modified as appropriate according to the mode of application of the system.

For example, the same effect that is achieved in the case where the terminal in communication with the mobile network 102 enters the wireless LAN 103 as described above can be achieved by controlling by an IMS server the mobile network packet gateway or the packet data gateway, whichever is to be controlled, when the terminal in communication with the wireless LAN 103 enters the mobile network 102, when the terminal in communication with the wireless LAN 103 enters another wireless LAN, and when the terminal in communication with the mobile network 102 enters another mobile network.

To disable branching of IP packets implemented according to the embodiment, a route change request containing an IP address for accessing a home network as the switch-to IP address may be issued.

A system similar to the system described above can be configured by integrating the home agent 115 with the mobile packet gateway 106 or the packet data gateway 110. In that case, the IP address for accessing the network matches the home IP address, a tunnel does not need to be provided and the efficiency of transmission is improved accordingly.

While a network to connect is determined on the basis of whether the terminal can connect to the network using a broadband for video transmission in the embodiment described above, a network to connect can be set on the basis of preference information concerning user's communication link.

Furthermore, when the registration process for branching packet transmission described in the embodiment is performed beforehand during the terminal 101 is in the standby state and then the terminal 101 starts communication, the branched packet transmission as described in the last part of the embodiment can be immediately performed.

When communication is disconnected, settings of all ports relating to the disconnected communication can be changed so as to disable branching. To that end, the terminal 101 may issues a route change request containing the IP address of the main gateway as the switch-to address to all ports to which packet transmission is branched at the time when the service is disconnected. Alternatively IMS sever may store ports used by the terminal in communication, and the IMS server may issue a route setting request that disables the branching to all the ports to the mobile network packet gateway or the packet data gateway, when the communication is disconnected.

When the embodiment is applied to Mobile IPv6, the same effect as that of the embodiment can be achieved by using hierarchical Mobile IPv6, setting the mobile network packet gateway 106 or the packet data gateway 110 as MAPs (Mobility Anchor Points), and storing their addresses in the care-of address 1102 field.

While the embodiment has been described with respect to the process in which the home network matches the main gateway, the same route switching as that in the embodiment can also be made when the home network differs from the main gateway, by providing in an IMS server the function of searching for a network to which the main gateway belongs. In that case, when the terminal 101 performs Mobile IP registration, information (such as the IP address of an IMS server, the IP address of a gateway, or a domain name) identifying the main gateway and the terminal ID of the terminal 101 may be registered with the IMS server. When the terminal 101 outputs a route change request to the IMS server, the IMS server may retrieve the information identifying the main gateway from the registered information and, based on that information, obtain the IP address of the IMS server that belongs to the same network to which the main gateway belongs from the information storing device 113.

While the method for changing route for switching between two networks before and after route change has been described in the embodiment described above, a route change for switching among three or more networks can be made: information identifying all networks to which the gateways used by the terminal 101 belong is stored in the first IMS server 107, and a route change request is sent from the first IMS server 107 to the IMS servers of all the networks used by the terminal 101, and each of the IMS servers that received the signal performs a transfer change process for the gateway that belongs to the same network as the IMS server in the same way as in the transfer change process performed by the second IMS server 111 in the embodiment described above.

While the route switching is accomplished by changing the settings of the gateways of multiple networks using IMS servers in the embodiment described above, the same effect as that of the embodiment described above can be achieved by providing an interface for sending and receiving a route change request between the gateways of the network used before route change and the network used after the route change, providing a search section which searches the IP address of the gateway of the network used before the route change from the network used after the route change, and performing a transfer change process similar to that of the embodiment described above to transfer from the network used before the route change.

The same effect as described above can also be achieved by providing between the terminal 101 and a gateway an interface used for route change, issuing a route change request containing an access IP address used before a route change and an access IP address used after the route change, the IP address of a transfer-destination gateway used after the route change, and the IP address of a main gateway from the terminal 101 to the gateways of all networks to which the terminal 101 can connect, and making changes by the gateways according to the request in a way similar to that in the embodiment described above.

While the first gateway to which the terminal accesses after the terminal is powered on is the main gateway for the terminal in the embodiment described above, the main gateway can be changed by updating data stored in the terminal status management section of each device as appropriate. In that case, the user of the terminal, or a network may be allowed to select a main gateway on the basis of the distance or positional relationship between the terminal and gateways, or switching may be made to a network that can provide the optimum communication for an application on the basis of the bandwidth, delay, and throughput of the main gateway and other gateways or a radio access network.

As has been described, according to the present invention, the terminal status management section 402 and the transfer setup section 403 are provided in an IMS server, an IMS server of a network to which ongoing connection is to be transferred sends a transfer setup request to an IMS server of a network from which the transfer is made, gateways of both networks store the IP addresses of a terminal used in the networks in the terminal states management section, and the packet relaying section 204 of the mobile network packet gateway 106, the packet relaying section 304 of the packet data gateway 110, and the IP allocation communication section 505 of the terminal 101 specify for each port a network to which packet data is to be transmitted. Thus, the system of the present embodiment has the effect, which cannot be achieved by conventional systems, of improving the quality of communication without modifying an existing home agent into the home agent 116.

Because an IMS server to which the terminal 101 issues a route change request and which performs operation for changing transfer settings of a gateway in accordance with the route change request is provided, an effect can be achieved that a user of the terminal 101 can flexibly change the transmission route of packet data by specifying a setting or operation of the terminal 101.

Furthermore, because the terminal control section 401 is provided in an IMS server so that the IMS server can cause the terminal control section 401 to control a gateway, an effect can be obtained that the transmission route of packet data can be changed for each port even when gateways of networks between which the terminal moves do not hold information about each other's addresses.

Second Embodiment

An interworking system according to a second embodiment has the same system configuration as that of the first embodiment. Therefore, FIGS. 1, 2, and 3 already referred to will be used as block diagrams showing a system configuration of the interworking system, an internal configuration of a mobile network packet gateway, and an internal configuration of a packet data gateway. Operation of the system subsequent to the last state of operation of the system described in the first embodiment will be described below.

Figure 18:
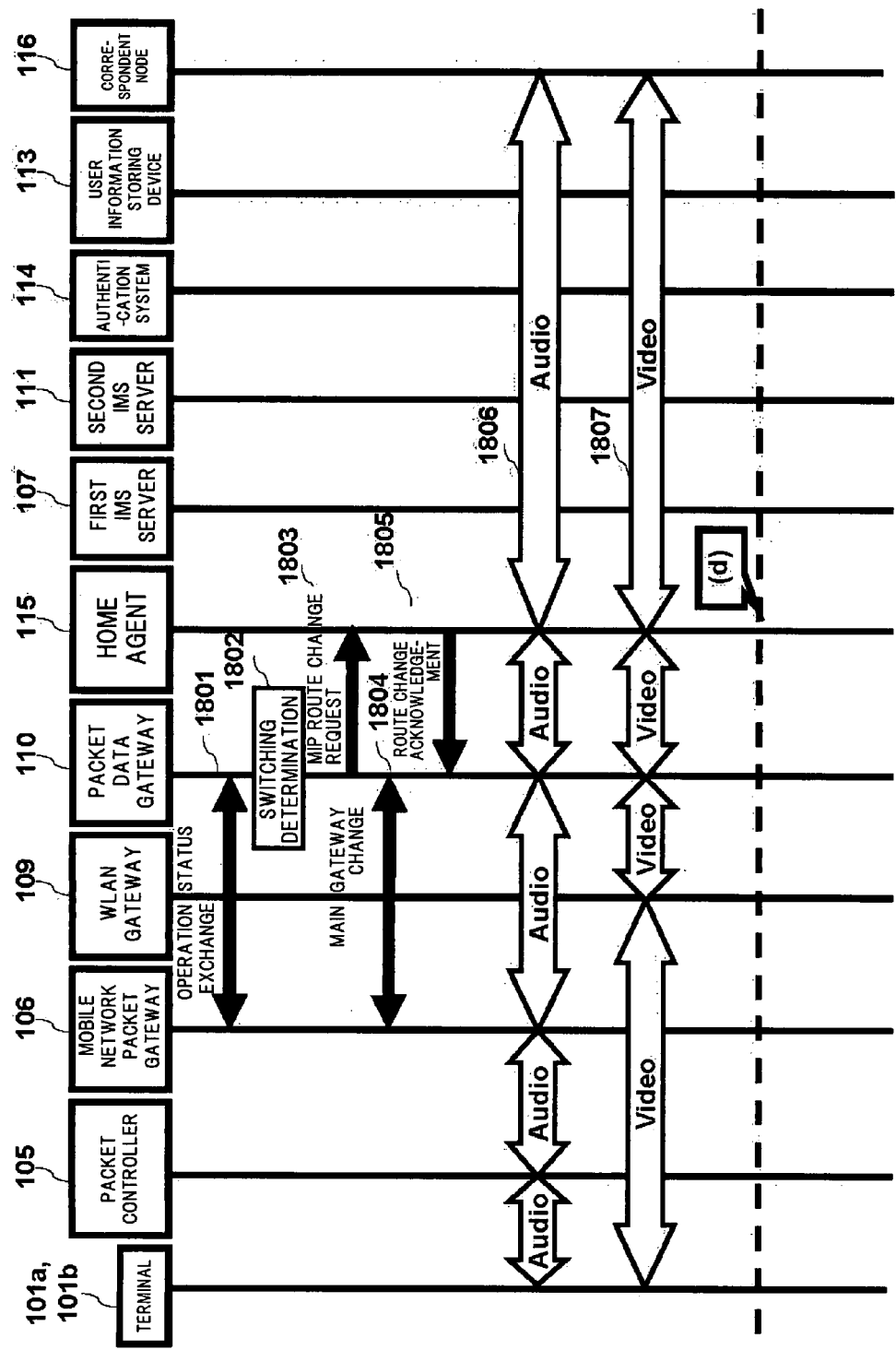
FIG. 18 is a sequence diagram showing operation of a system according to a second embodiment of the present invention.
Figure 19:
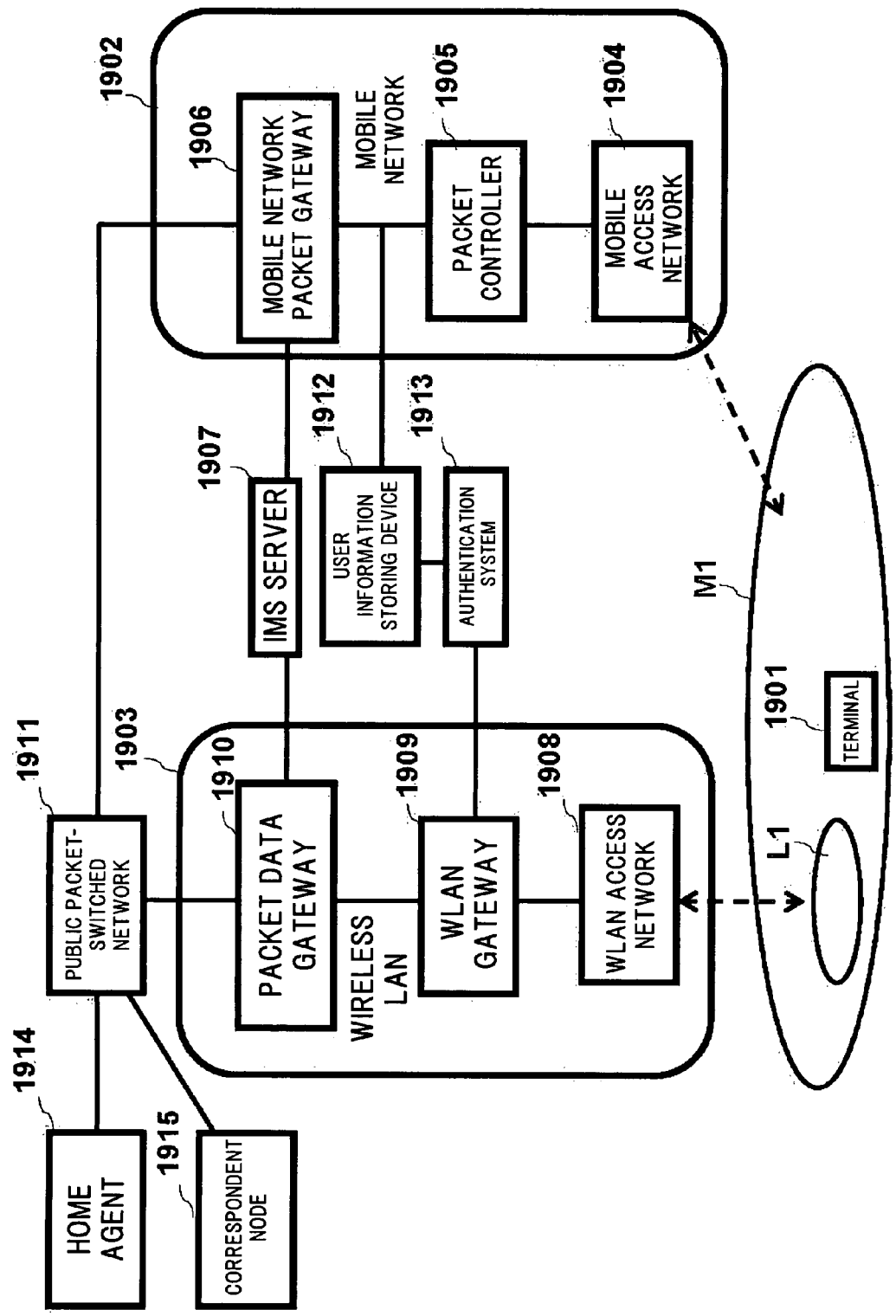
FIG. 19 is a diagram for illustrating an overview of a configuration of a system which is a combination of Mobile IPv6 and 3GPP interworking system.
Figure 20:
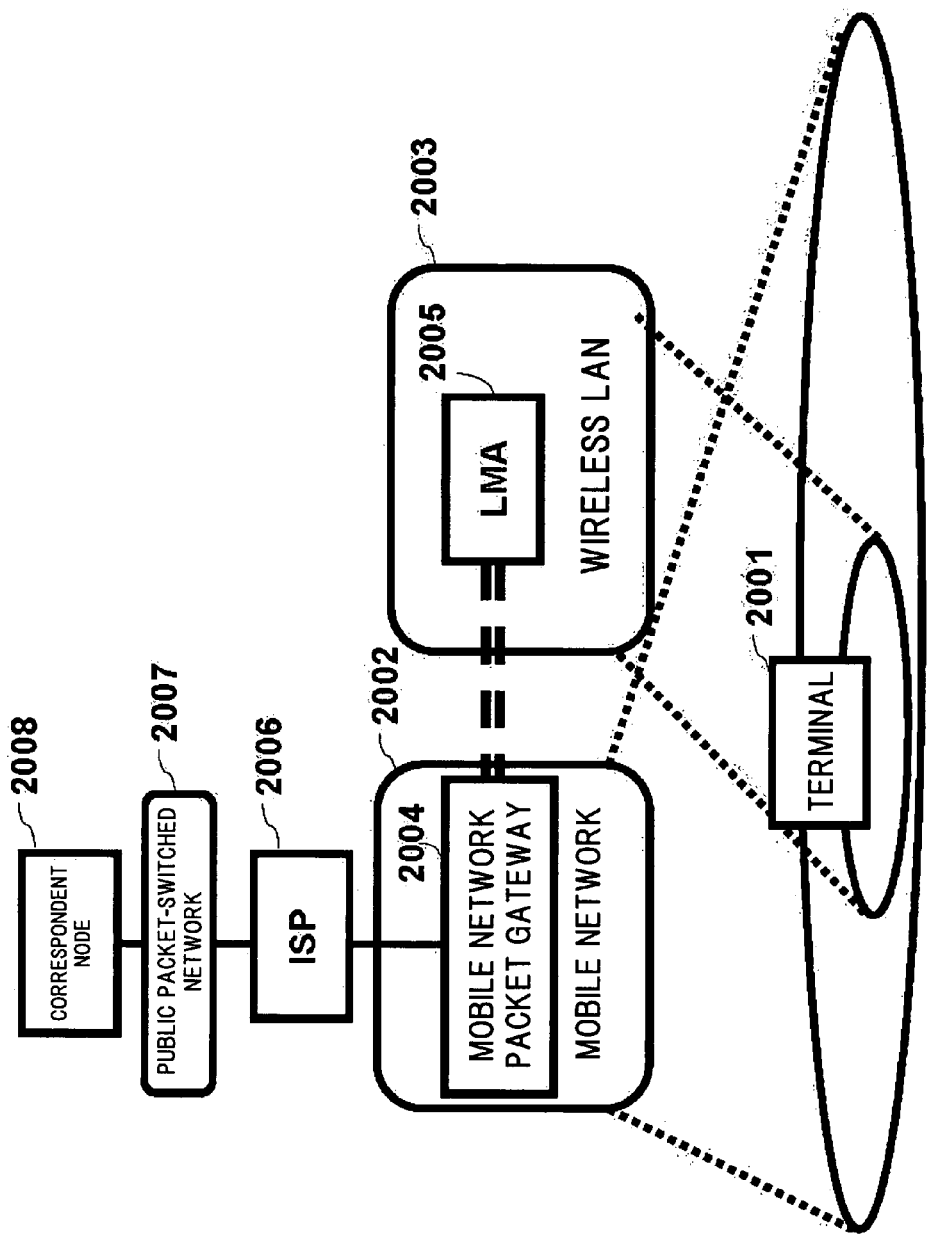
FIG. 20 is a conceptual diagram for illustrating a method disclosed in Japanese Patent Application Laid-Open No. 2004-180311.

FIG. 18 is a sequence diagram showing operation of a system according to the second embodiment of the present invention. Operation subsequent to the last state of operation of the system described in the first embodiment is shown in the sequence diagram.

A mobile network packet gateway 106 and a packet data gateway 110 exchange information about each other's operation as operation status exchange 1801 at regular intervals. The operation information is information such as the traffic, the numbers of connections, the CPU usage rates, and the line usage rates of the mobile network packet gateway 106 and the packet data gateway 110. The operation status exchange 1801 may be exchanged when a terminal exists that can access both of the mobile packet gateway 106 and the packet data gateway 110 at the same time.

In the mobile network packet gateway 106, a GGSN connection setup section 201 measures the state of the mobile network packet gateway 106 and outputs the state to the packet data gateway 110 through a PDG/PDN communication section 206. On the other hand, operation information provided from the packet data gateway 110 is input in a PDG status management section 203 through the PDG/PDN communication section 206.

In the packet data gateway 110, a PDG connection setup section 301 measures the state of the packet data gateway 110 and outputs the state to the mobile network packet gateway 106 through a GGSN/PDN communication section 306. On the other hand, operation information provided from the mobile network packet gateway 106 is input in an SSGN status management section 303 through a GGSN/PDN communication section 306.

At "Switching determination" (step S1802), the GGSN status management section 303 in the packet data gateway 110 obtains information and the PDG connection setup section 301 determines whether the load or congestion is heavy or not on the basis of the operation information obtained in the operation status exchange 1801 to determine whether to make switching.

In the mobile network packet gateway 106, the PDG status management section 203 obtains the operation information and the GGSN connection setup section 201 makes determination based on the operation information. The mobile network packet gateway 106 determines whether load or congestion is heavy or not on the basis of the information about operation of the mobile network packet gateway 106 and the packet data gateway 110.

If the packet data gateway 110 determines to make switching, the packet data gateway 110 issues an MIP route change request 1803 to a home agent 115.

In the packet data gateway 110, the PDG connection setup section 301 extracts the terminal IDs of all terminals that are using the home agent 115, the home IP addresses, and access IP addresses. The PDG connection setup section 301 stores all sets of the data as well as the IP address IPp of the packet data gateway 110, which issues a request to each set, in the main gateway IP address 706 field (see FIG. 7). The PDG connection setup section 301 generates an MIP route change request 1803 containing the IP address IPp of the packet data gateway 110 as a care-of address of all of the extracted terminals and provides it to the home agent 115. Then packets are relayed by following the flow shown in FIG. 17 referred to in the first embodiment.

The packet data gateway 110 outputs a main gateway change signal 1804 to the mobile network packet gateway 106 to instruct the mobile network packet gateway 106 to change the main gateway. The main gateway change signal 1804 is a signal for changing the main gateway address for all terminals contained in the MIP route change request 1803 to the IP address IPp of the packet data gateway 110.

When the terminal control section 201 in the mobile network packet gateway 106 detects the main gateway change signal 1804 instructing to change the main gateway, the terminal control section 201 changes the main gateway IP address 706 for all terminal IDs contained in the main gateway change 1804 from IPg to IPp. After the completion of the process, the mobile network packet gateway 106 provides a response indicating the completion to the packet data gateway 110.

When the MIP route change request 1803 is input, the home agent 115 changes the care-of address entries associated with all relevant terminals to the IP address IPp of the packet data gateway 110 and also changes the transmission paths for packets of the terminals associated with the changed entries.

After the completion of the process, the home agent 115 sends a route change acknowledgement 1805 to the packet data gateway 110.

The new route for audio data established as a result of the process described above is denoted by 1806 (Audio) and the new route for video data by 1807 (Video). The point of time of the change is denoted by "time (d)" and data stored in each node at the point of time is shown in column (d) in FIGS. 6 to 11.

The same effect as that of the embodiment can be obtained by specifying the timing of changing the main gateway in the main gateway change signal 1804 provided to the mobile network packet gateway 106 so that the change is made in synchronization with the main gateway change in the packet data gateway 110. In addition, a problem can be avoided that the timing of changing values goes out of synchronization between the mobile network gateway 106 and the packet data gateway 110 and, as a result, IP packets are transferred back and forth between the mobile network packet gateway 106 and the packet data gateway 110 and are eventually discarded.

While the switching is accomplished by exchanging signals between the mobile network packet gateway 106 of a mobile network and the packet data gateway 110 of a wireless LAN in the embodiment, a message directing or recommending to change the main gateway (the care-of address) may be sent to a potential terminal that can change the main gateway, instead of the MIP registration change request 1803 from the packet data gateway 110. Furthermore, the terminal may issue a request for changing the care-of address to the home agent 115 in accordance with the message. This arrangement also has the same effect as that of the embodiment described above and, in addition, has the effects of enabling the user of the terminal to determine whether the change can be made or not and of eliminating the need for an interface between the mobile network packet gateway 106 and the packet data gateway 110, thereby making the use of existing devices easier.

While all terminals that belong to the main gateway to be changed are switched at once in the embodiment describe above, the terminals to be switched can be limited on the basis of the states of the terminals, services that the terminals are using, and QoS parameters required for the terminals or other parameters.

Thus, the present embodiments described above have an effect that increase in the load and congestion on a network can be avoided by the provision of: the mobile network packet gateway 106 including the GGSN connection setup section 201 that notifies the status of operation of the mobile network packet gateway 106 and changes the main gateway, and the packet data gateway 110 including the PDG connection setup section 301 that notifies the status of the packet data gateway 110 and changes the main gateway, thereby changing the route of traffic transmitted to the home agent 115.

While the embodiments preferable as of the date of preparation of this application have been described above, it will be understood that various modification can be made to the embodiments and it is intended to cover in the attached claims all such modifications and variations as fall within the true spirit and scope of the present invention.

INDUSTRIAL APPLICABILITY

A radio communication system according to the present invention has the capability of allowing a user to select a communication network to use in accordance with the type and features of data to be transmitted and therefore is useful as an interworking system between multiple communication networks. The radio communication system is also applicable to applications such as problem prevention for a communication common carrier to avoid concentration of load or congestion on a particular network or nodes.

The invention claimed is:
1. A radio communication system comprising:
a public packet-switched network;
a plurality of radio communication networks, each comprising a gateway;
a terminal capable of establishing packet connection with the plurality of radio communication networks;
a correspondent node which performs packet communication with the terminal over the public packet-switched network; and
a router which manages a destination address of the terminal, the destination address changing in accordance with movement of the terminal;
wherein the terminal specifies, for each port number of the terminal, a gateway that relays packets sent from the correspondent node to the terminal and sets information which specifies the gateway in a main gateway selected from the plurality of gateways;
the router outputs packets which are input from the correspondent node and are directed to the terminal to the main gateway;
the main gateway outputs packets directed to the terminal to a transfer-destination gateway associated with an IP address specified for each port number of the terminal;
the gateway outputs packets which are input from the main gateway and are directed to the terminal to the terminal; and the terminal outputs packets directed to the correspondent node to the transfer-destination gateway associated with the IP address specified for each port number.

2. The radio communication system according to claim 1, further comprising:
a main-network IMS server which belongs to a main radio communication network having the main gateway therein and controls a packet call; and
a visited-network IMS server which belongs to a visited radio communication network other than the main radio communication network and controls a packet call;
wherein:
the visited-network IMS server performs transfer setup processing for relaying packets having a specified port number to a gateway provided in the visited radio communication network and outputs to the main-network IMS server a route change request containing a set of an identifier of the terminal, the port number, and an IP address of the transfer-destination gateway; and
the main-network IMS server performs transfer setup processing for changing the transfer destination of packets having a specified port number to the transfer-destination gateway in response to the route change request, the transfer setup processing being applied to the main gateway.

3. The radio communication system according to claim 2, wherein:
the terminal is capable of outputting the route change request to the main-network IMS server or the visited-network IMS server; and
the visited-network IMS server performs the transfer setup processing in response to the route change request from the terminal.

4. The radio communication system according to claim 2, further comprising
a gateway setup section which outputs operation information concerning one gateway selected from the plurality of gateways, and an operation information management section which collects operation information output from another of the plurality of gateways,
wherein:
the selected one gateway compares operation information concerning the selected one gateway with operation information concerning the another gateway and performs main-gateway change processing for changing the main gateway on the basis of the result of the comparison, the main-gateway change processing being applied to the another gateway;
the another gateway performs change processing for changing a main gateway associated with the terminal which is specified on the basis of the main-gateway change processing to the selected one gateway; and
the selected one gateway outputs to the router an MIP route change request for registering an address of the selected one gateway as a care-of address when the main gateway is changed.

5. A radio communication method in a system comprising a public packet-switched network, a plurality of radio communication networks, a terminal capable of establishing packet connection with the plurality of radio communication networks, a correspondent node which performs packet communication with the terminal, a gateway provided in each of the plurality of radio communication networks and connected to the correspondent node through the public packet-switched network, and a router which manages a destination address of the terminal which changes in accordance with movement of the terminal;
the radio communication method comprising the steps of:
by the terminal, specifying for each port number of the terminal a gateway which relays packets sent from the correspondent node to the terminal and setting information which specifies a gateway to a main gateway selected by the terminal from among the plurality of gateways;
outputting, by the router, packets which are input from the correspondent node and directed to the terminal to a main gateway selected from among the plurality of gateways in accordance with the terminal;
outputting, by the main gateway, packets directed to the terminal to an IP address of a transfer-destination gateway specified for each port number of the terminal; and
outputting, by the gateway, packets input from the main gateway and directed to the terminal to the terminal; and
outputting, by the terminal, packets directed to the correspondent node to the IP address of the transfer-destination gateway specified for each port number.

6. The radio communication method according to claim 5, further comprising the steps of:
performing, by the visited-network IMS server which controls a packet call for each visited network which does not belong to a main radio communication network in which the main gateway is provided, transfer setup processing for relaying packets having a specified port number to a gateway provided in the visited radio communication network and outputting a route change request containing a set of an identifier of the terminal, the port number, and an IP address of the transfer-destination gateway to the main-network IMS server that belongs to a main radio communication network in which the main gateway is provided and controls a packet call; and
performing, by the main-network IMS server, transfer setup processing for changing the transfer destination of packets having a specified port number to the transfer-destination gateway in response to the route change request, the transfer setup processing being applied to the main gateway.

7. The radio communication method according to claim 5, further comprising the steps of:
outputting, by the terminal, the route change request to the main-network IMS server or the visited-network IMS server; and
performing, by the visited-network IMS server, the transfer setup processing in response to a route change request from the terminal.

8. The radio communication method according to claim 5, further comprising the steps of:
comparing, by one gateway selected from the plurality of gateways, operation information concerning the selected one gateway with operation information concerning another of the plurality of gateways and performing main-gateway change processing for changing the main gateway on the basis of the result of the comparison, the main-gateway change processing being applied to the another gateway;
changing, by the another gateway, a main gateway associated with the terminal specified on the basis of the main-gateway change processing to the selected one gateway; and
outputting, by the selected one gateway, an MIP route change request for registering an address of the selected one gateway as a care-of address to the router when the main gateway is changed.

* * * * *